US008731989B2

(12) United States Patent
Al-Ahaidib et al.

(10) Patent No.: US 8,731,989 B2
(45) Date of Patent: May 20, 2014

(54) PROJECT MANAGEMENT SYSTEMS AND METHODS THEREOF

(71) Applicant: King Abdulaziz City for Science and Technology, Riyadh (SA)

(72) Inventors: Hassan S. Al-Ahaidib, Riyadh (SA); Talal I. Al-Dhuayan, Riyadh (SA); Mohammad A. Al-Fawzan, Riyadh (SA); Sultan M. Al-Jaedi, Riyadh (SA); Mohammad S. Khorsheed, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 0 days.

(21) Appl. No.: 13/653,435

(22) Filed: Oct. 17, 2012

(65) Prior Publication Data

US 2013/0103448 A1 Apr. 25, 2013

Related U.S. Application Data

(62) Division of application No. 13/165,051, filed on Jun. 21, 2011.

(51) Int. Cl.
*G06Q 10/00* (2012.01)
*G06Q 10/10* (2012.01)

(52) U.S. Cl.
CPC .................................. *G06Q 10/1097* (2013.01)
USPC ......................................................... 705/7.21

(58) Field of Classification Search
CPC . G06Q 10/06; G06Q 10/10; G06Q 10/06316; G06Q 50/184; G06Q 50/18

USPC ........................................ 705/310, 7.15, 7.21
See application file for complete search history.

(56) References Cited

U.S. PATENT DOCUMENTS

| | | | |
|---|---|---|---|
| 6,854,088 B2 | 2/2005 | Massengale et al. | |
| 6,970,842 B1 | 11/2005 | Ashby | |
| 7,302,674 B1 | 11/2007 | Gladieux et al. | |
| 7,305,392 B1 | 12/2007 | Abrams et al. | |
| 8,082,277 B1 * | 12/2011 | O'Brien et al. | 707/802 |
| 2001/0044738 A1 | 11/2001 | Elkin et al. | |
| 2002/0120480 A1 | 8/2002 | Kroeger | |
| 2003/0106039 A1 * | 6/2003 | Rosnow et al. | 717/100 |
| 2003/0142128 A1 | 7/2003 | Reulein et al. | |
| 2005/0027585 A1 * | 2/2005 | Wodtke et al. | 705/9 |
| 2005/0235061 A1 * | 10/2005 | Debber et al. | 709/224 |

(Continued)

OTHER PUBLICATIONS

Office Action dated Nov. 9, 2012 in U.S. Appl. No. 13/165,051, 7 pages.

(Continued)

*Primary Examiner* — Johnna Loftis
(74) *Attorney, Agent, or Firm* — Andrew M. Calderon; Roberts Mlotkowski Safran & Cole, P.C.

(57) ABSTRACT

Project management systems and methods to streamline project planning, task management, time management, and other similar applications. The method includes filing a request to start a project on a project management system. The method further includes receiving notice that role handlers have been assigned to a plurality of tasks required to complete the project. The method further includes performing at least one task of the plurality of tasks. The method further includes receiving notice that the at least one task has been reviewed by at least one of the assigned role handlers.

23 Claims, 28 Drawing Sheets

(56) References Cited

U.S. PATENT DOCUMENTS

| | | | |
|---|---|---|---|
| 2005/0246216 A1* | 11/2005 | Rosen et al. | 705/8 |
| 2006/0047558 A1 | 3/2006 | Uchiyama et al. | |
| 2006/0167736 A1 | 7/2006 | Weiss | |
| 2006/0195494 A1 | 8/2006 | Dietrich | |
| 2007/0038494 A1* | 2/2007 | Kreitzberg et al. | 705/8 |
| 2008/0077530 A1* | 3/2008 | Banas et al. | 705/50 |
| 2009/0313207 A1 | 12/2009 | Boss et al. | |

OTHER PUBLICATIONS

Final Office Action dated Aug. 8, 2013 in U.S. Appl. No. 13/165,051, 7 pages.

* cited by examiner

3005

3010

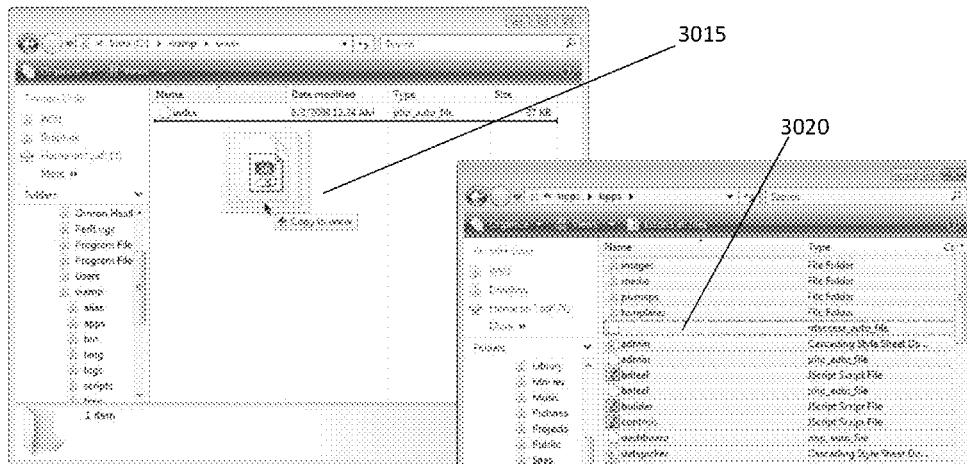
Fig. 3d
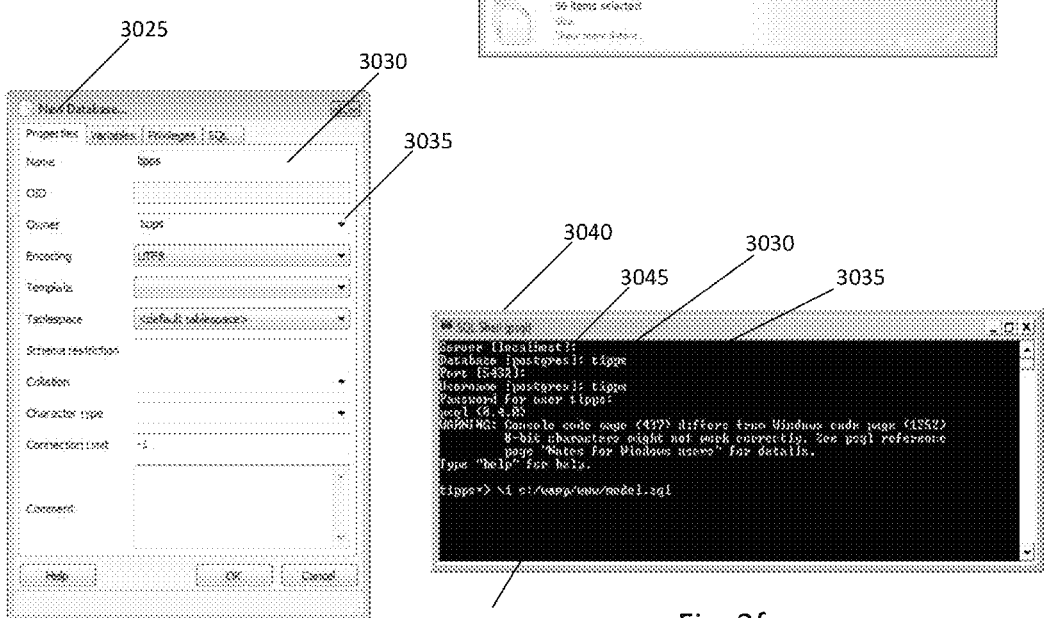
Fig. 3e
Fig. 3f

```
<tr>
<td class="formLabel">Project Title</td>
<td class="formData"><input type="text" name="funding_project_title"></td>
</tr>
```
12055

```
<tr>
<td class="formLabel">Describe The Commercial Potential</td>
<td class="formData">
<textarea name="description"></textarea>
</td>
</tr>
```
12070  Fig. 12i

```
<tr>
<td class="formLabel">Date</td>
<td class="formData">
<input class="dateformat-d-sl-m-sl-Y formDatePicker"
type="text"
name="conception_date_date"></td>
</td>
</tr>
```
Fig. 12k  12080
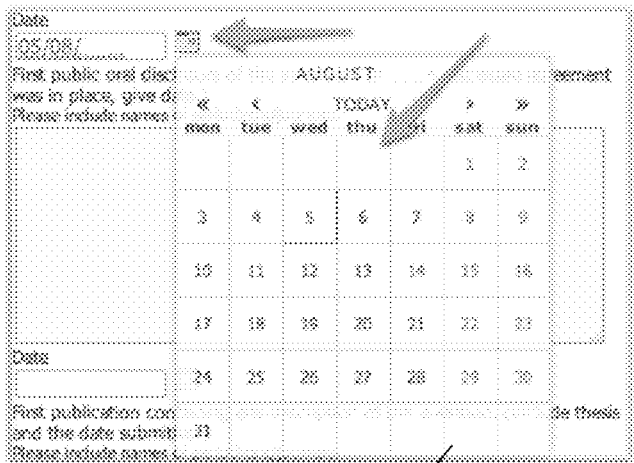
Fig. 12l  12085
```
<tr>
<td class="formLabel">Background Search Document 1</td>
<td class="formData">
<file name="background_search_doc_1"></file>
</td>
</tr>
```
Fig. 12m  12090
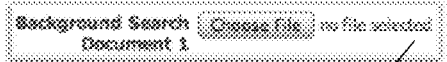
Fig. 12n  12095

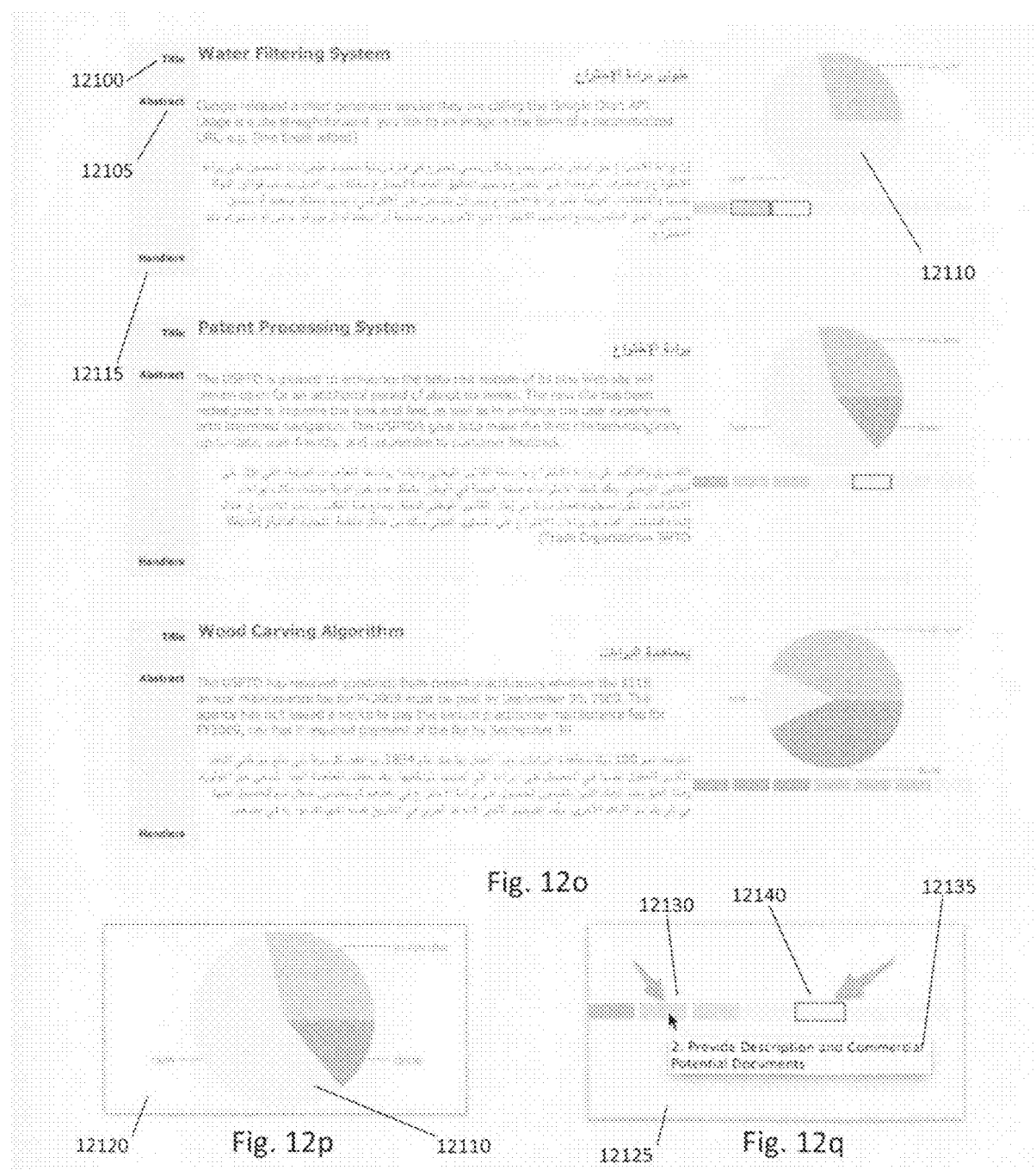

PROJECT MANAGEMENT SYSTEMS AND METHODS THEREOF

CROSS REFERENCE TO RELATED APPLICATION

This application is a divisional application of copending U.S. patent application Ser. No. 13/165,051 filed on Jun. 21, 2011, the contents of which are incorporated herein by reference in their entirety.

FIELD OF THE INVENTION

The invention generally relates to project management systems and methods, and in particular, to project management systems and methods to streamline project planning, task management, time management, and other similar applications.

BACKGROUND

Businesses expend numerous resources and time organizing and tracking various projects or tasks. In particular, large project scopes and communication breakdown between various team members often present barriers to effective project management.

Effective project management is an important factor to success of projects. A project can be thought of as a collection of activities and tasks designed to achieve a specific goal of an enterprise, with specific performance or quality requirements while meeting any time and cost constraints. Project management refers to the managing of the activities that lead to successful completion of a project.

Typically, for any given project, several project tasks are defined. Project tasks describe the activities and phases that have to be performed in the project such as submitting an invention disclosure, researching related art, reviewing business needs, etc. and can be arranged in a hierarchy. However, it may be desirable not only to view a project in terms of tasks, but also in terms of personnel assigned to complete each task. This may allow personnel working on the various tasks to have a better understanding of each person's role in the project and help in effective project management.

Accordingly, there exists a need in the art to overcome the deficiencies and limitations described hereinabove.

SUMMARY

In a first aspect of the invention, a method is provided comprising filing a request to start a project on a project management system. The method further comprises receiving notice that role handlers have been assigned to a plurality of tasks required to complete the project. The method further comprises performing at least one task of the plurality of tasks. The method further comprises receiving notice that the at least one task has been reviewed by at least one of the assigned role handlers.

In another aspect of the invention, a method is provided for reviewing a project comprising assigning role handlers to the project. The method further comprises sending a notification to a first role handler that a new task for the project has been completed. The method further comprises providing the first role handler with a due date for completing a review of the new task. The method further comprises receiving a completed review of the new task by the first role handler. The method further comprises sending a notification to a second role handler that the new task has been reviewed by the first assigned role handler. The method further comprises providing the second assigned role handler with a due date for completing a review of the new task. The method further comprises receiving a completed review of the new task by the second role handler In another aspect of the invention, a computer program product is provided comprising a computer usable storage medium having readable program code embodied in the storage medium. The computer program product includes at least one component operable to receive a request from a user to start a project. The at least one component is further operable to send a notice that role handlers have been assigned to a plurality of tasks required to complete the project. The at least one component is further operable to send a notice that at least one task of the plurality of tasks is requiring completion. The at least one component is further operable to send a notice that the at least one task has been reviewed by at least one of the assigned role handlers. The sending the notice that the role handlers have been assigned comprises displaying the notice on a page and sending an email to the user. The sending the notice that the at least one task is requiring completion comprises displaying the at least one task along with a due date for completing the at least one task on the web page with the notice that the role handlers have been assigned.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 3b-3h, 4a-4c, 5a-5b, 6a-6c, 7a-7b, 8a-8m, 9a-9l, 10a-10b, 11a-b, and 12a-12q show a series of illustrative functions of the system in accordance with aspects of the invention.

DETAILED DESCRIPTION OF THE INVENTION

Figure 1:
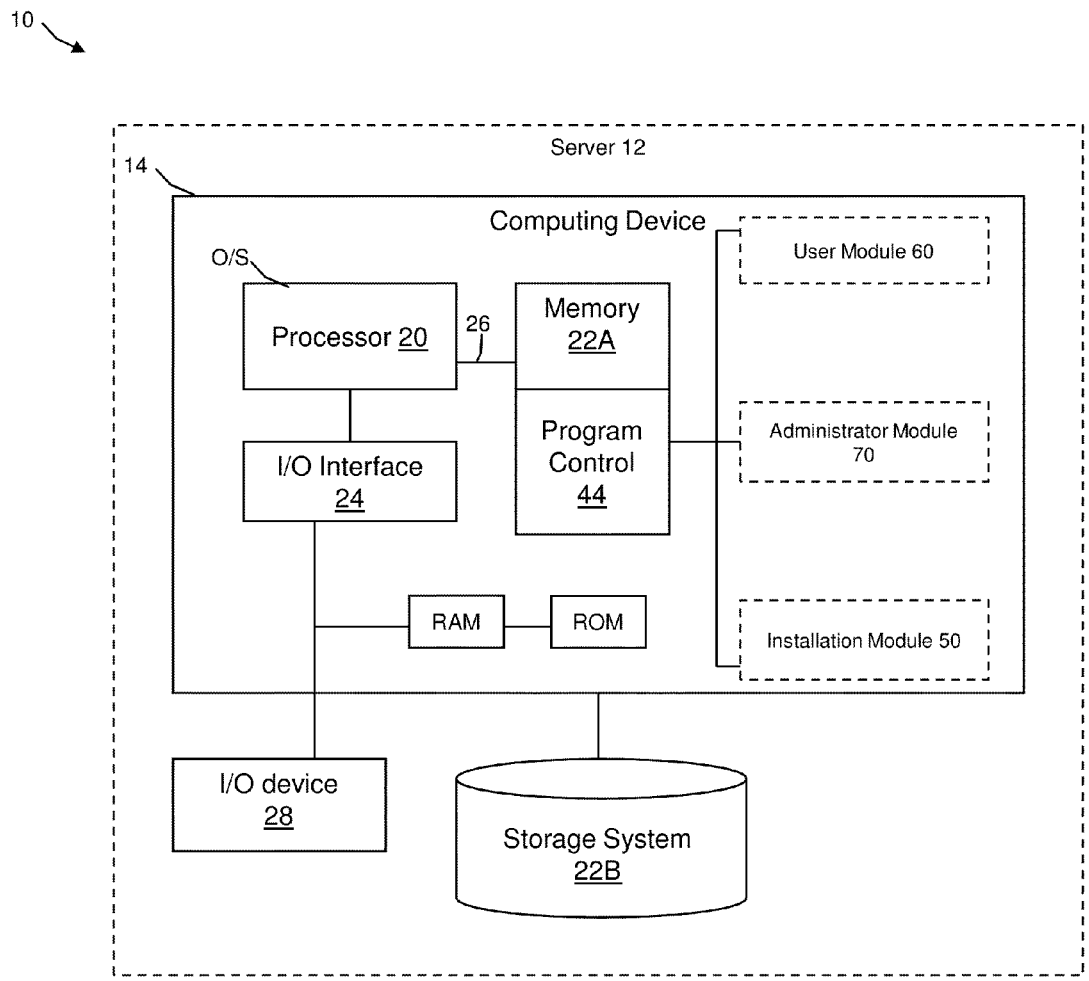
FIG. 1 is an illustrative external environment for implementing the invention in accordance with aspects of the invention.

The invention generally relates to project management systems and methods, and in particular, to project management systems and methods that are designed to streamline project planning, task management, time management, and other business applications. More specifically, the invention relates to an invention disclosure and process system (hereinafter referred to as Technology Development Center (TDC) Invention and Patent Processing System (TIPPS)) that streamlines the process of preparing, filing and tracking the progress of a patenting process, e.g., from invention disclosure to the preparation and filing of a patent application, by providing clearly defined roles and tasks that are required for completion of such a project. Although the project management systems and methods discussed herein pertain to the patenting process, it should be understood that the systems and processes disclosed herein may be applied to a variety of different projects and, as such, the present invention is not limited to the patenting process.

The patenting process involves a set of tasks to be performed in a timely manner by a group of different individuals, at different stages of the application process. For example, each individual plays a role in the patent process and may handle some of the patent application related tasks. In embodiments, tasks to complete the project may include various actions performed for each task, depending on the individual manipulating the task.

In embodiments, the following non-exhaustive list provides examples of actions that can be performed on a task: submitting, completing, resetting, and commenting. Submitting may comprise editing or complete a field of the task. Completing may comprise marking the task as being performed and completed. Resetting may comprise beginning, again, completing a task. Commenting may comprise adding comments regarding a task.

The individuals that perform the actions to complete the tasks and the project have any number of various roles that are related to the patent process. For example, the following non-exhaustive list provides examples of roles for the individuals: Inventor, Inventor Supervisor, TDC Reviewer, and Attorney. The inventor or inventors may initiate the patent process, and they are typically responsible for completing information requested in each task. The inventor supervisor, on the other hand, may supervise the inventors during the patent process and may optionally be required to complete tasks. The TDC reviewer may review tasks submitted by the inventor and inventor supervisor, and may generally have authority to complete or reset tasks that are deemed acceptable or not respectively. The attorney may perform legal-related tasks such as, for example, preparing and filing the patent application, with the cooperation of the inventors. The attorney, in embodiments, has authority to complete or reset tasks that are deemed acceptable or unacceptable, respectively.

In accordance with aspects of the invention, the steps of preparing a patent application in accordance with the TIPPS system include: (1) installation of the TIPPS system, (2) TIPPS sign-up, (3) patent research, (4) filing a patent request, (5) role handlers assignment, (6) task submissions, (7) task reviews, (8) TDC approval, and (9) patent award. Advantageously, the TIPPS system clearly defines tasks required for the completion of each step of filing a patent application and provides a means for effective communication to emphasize task due dates, the individual or role responsible for each task, and the sending of notifications on tasks due and project events.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage of expression having computer-usable program code embodied in the medium. The computer-usable or computer-readable medium may be any medium that can contain, store, or communicate, for use by or in connection with the instruction execution system, apparatus, or device. The computer-usable or computer-readable medium may be, for example, an electronic, magnetic, optical, electromagnetic, infrared, or semiconductor system, apparatus, or device.

Any combination of one or more computer readable medium(s) may be utilized. The computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

FIG. 1 shows an illustrative environment 10 for managing the processes in accordance with the invention. The environment 10 includes a server or other computing system 12 that can perform the processes described herein. The server 12 includes a computing device 14, which can be resident on a network infrastructure or computing device. The computing device 14 includes a processor 20, memory 22A, an I/O interface 24, and a bus 26. In addition, the computing device includes random access memory (RAM), a read-only memory (ROM), and an operating system (O/S).

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention such as, for example, translating a text-based command assigned to a service command configured to control a service, into the service command, as will be discussed below.

The computing device 14 includes an installation module 50, a user module 60, and an administrator module 70 that may be a portion of the computer program code. Alternatively, the installation module 50, the user module 60, and the administrator module 70 may be located in computer program code of another computing device. By way of non-limiting example, the installation module 50, the user module 60, and the administrator module 70 can be located on a client device, a third-party service provider, or a public or private server. Further for example, the installation module 50, the user module 60, and the administrator module 70 can be implemented as the following:

a Graphical User Interface (GUI) application in a client device that can translate GUI commands into text-based commands;

a standalone application in a client device; and/or a gadget on a computer desktop or in a web site.

The installation module 50, the user module 60, and the administrator module 70 perform the processes of the invention, for example, installation of the TIPPS system, TIPPS sign-up, patent research, filing a patent request, role handlers assignment, task submissions, task reviews, TDC approval, and patent award, as described in detail below, and each can be its own dedicated special processor or combination thereof.

Flow Diagram

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
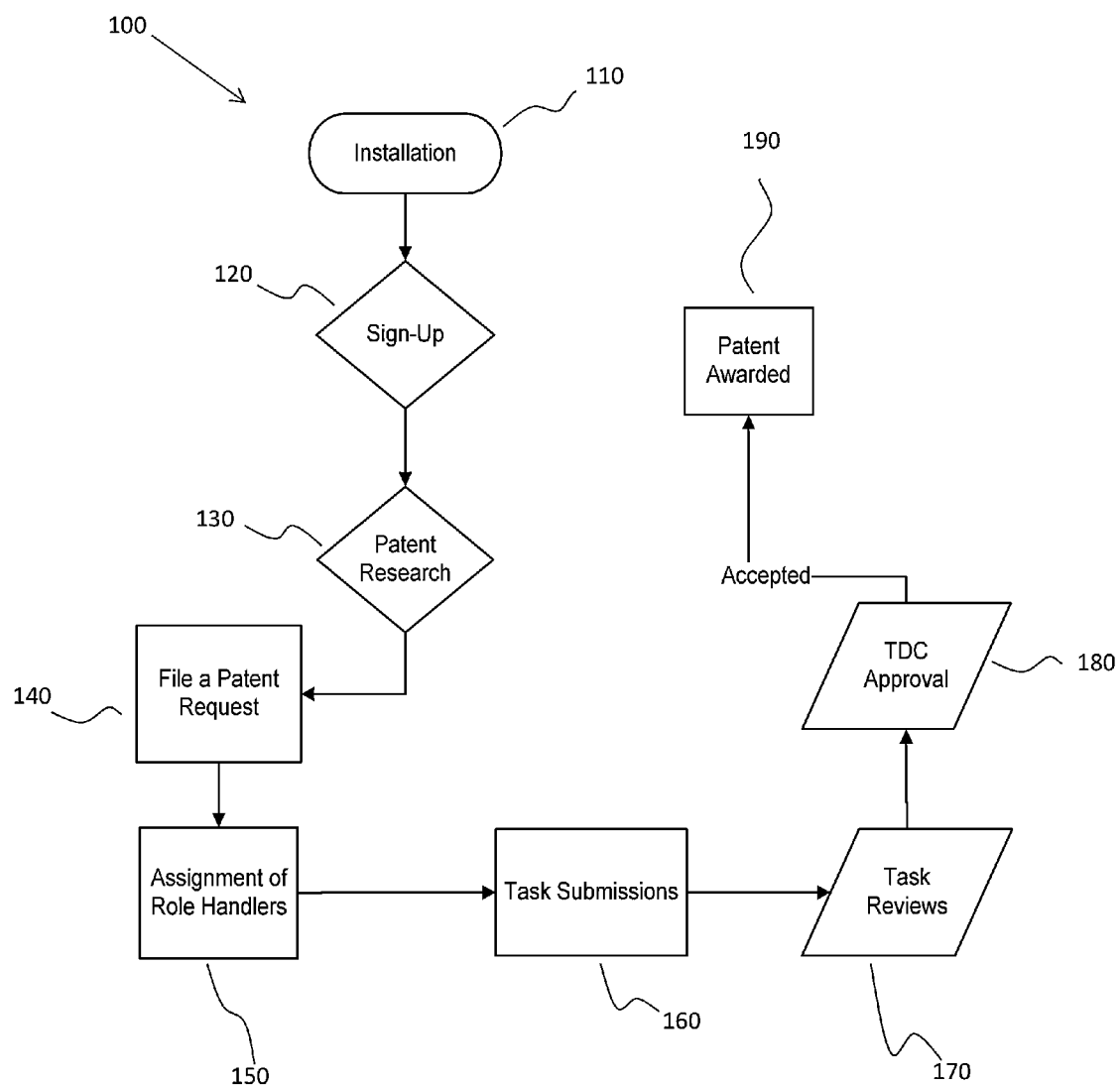
FIG. 2 is an illustrative process flow of implementing the system in accordance with aspects of the invention.
Figure 3A:
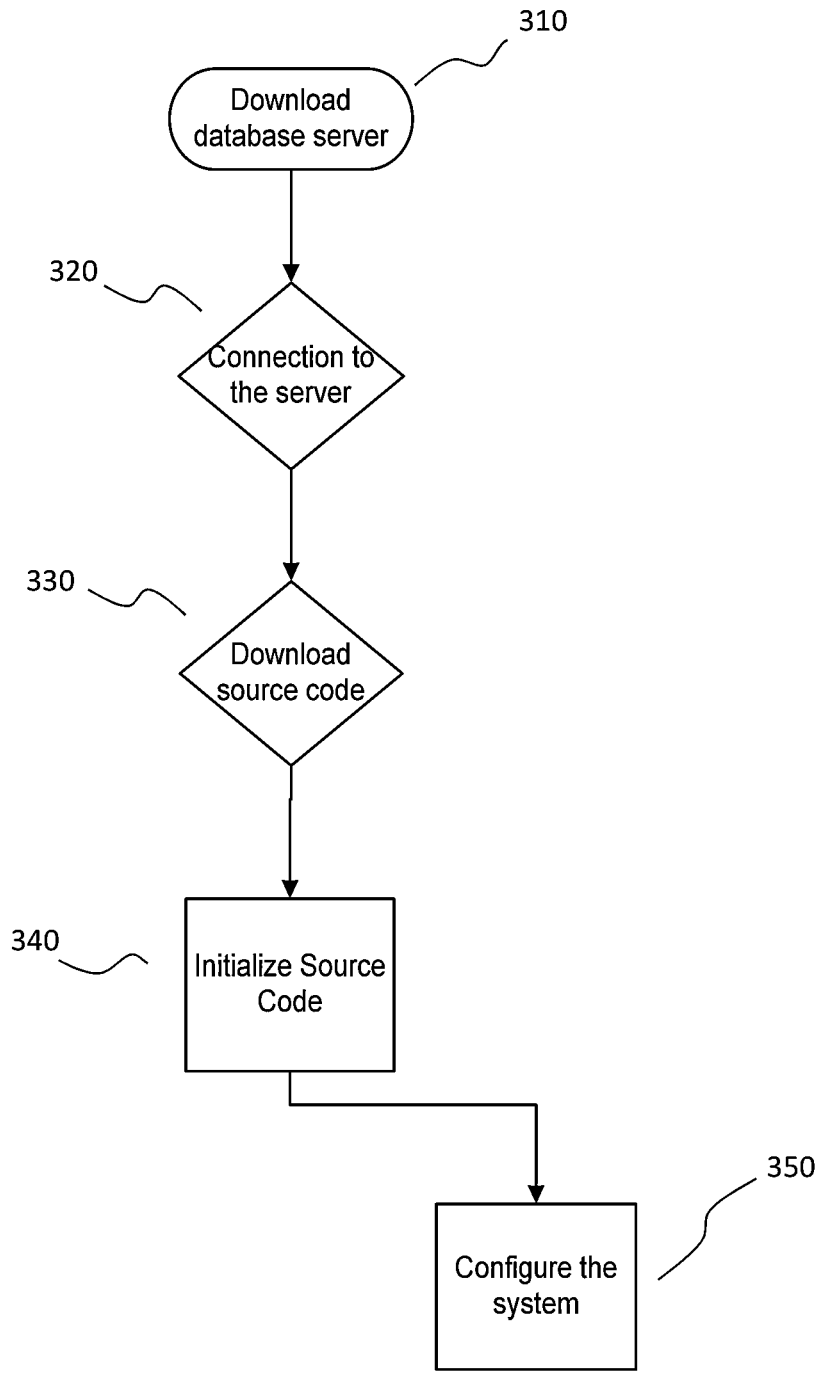
FIG. 3a is an illustrative process flow of implementing the system in accordance with aspects of the invention.
Figures 10A, 10B:
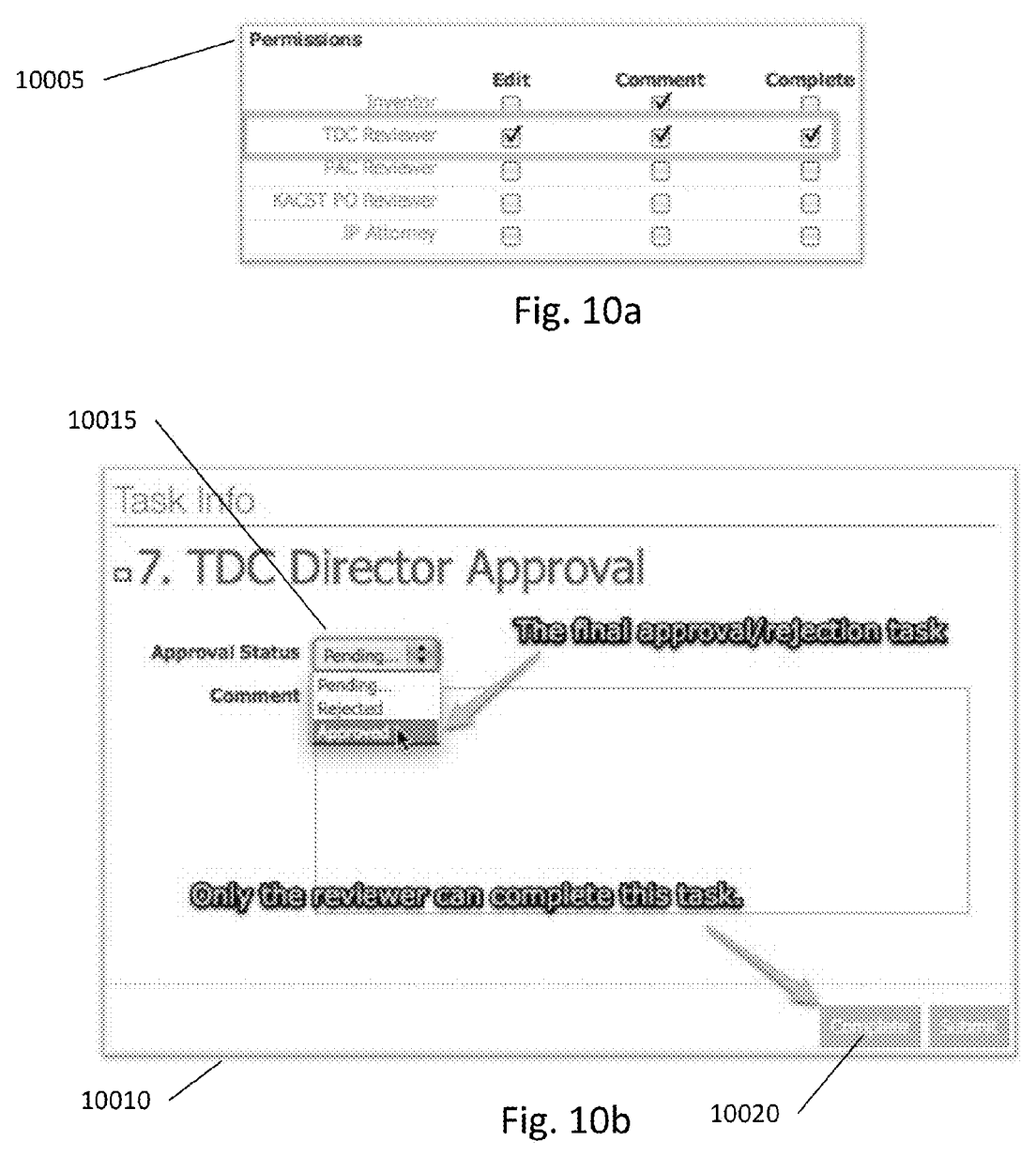
Figure 10C:
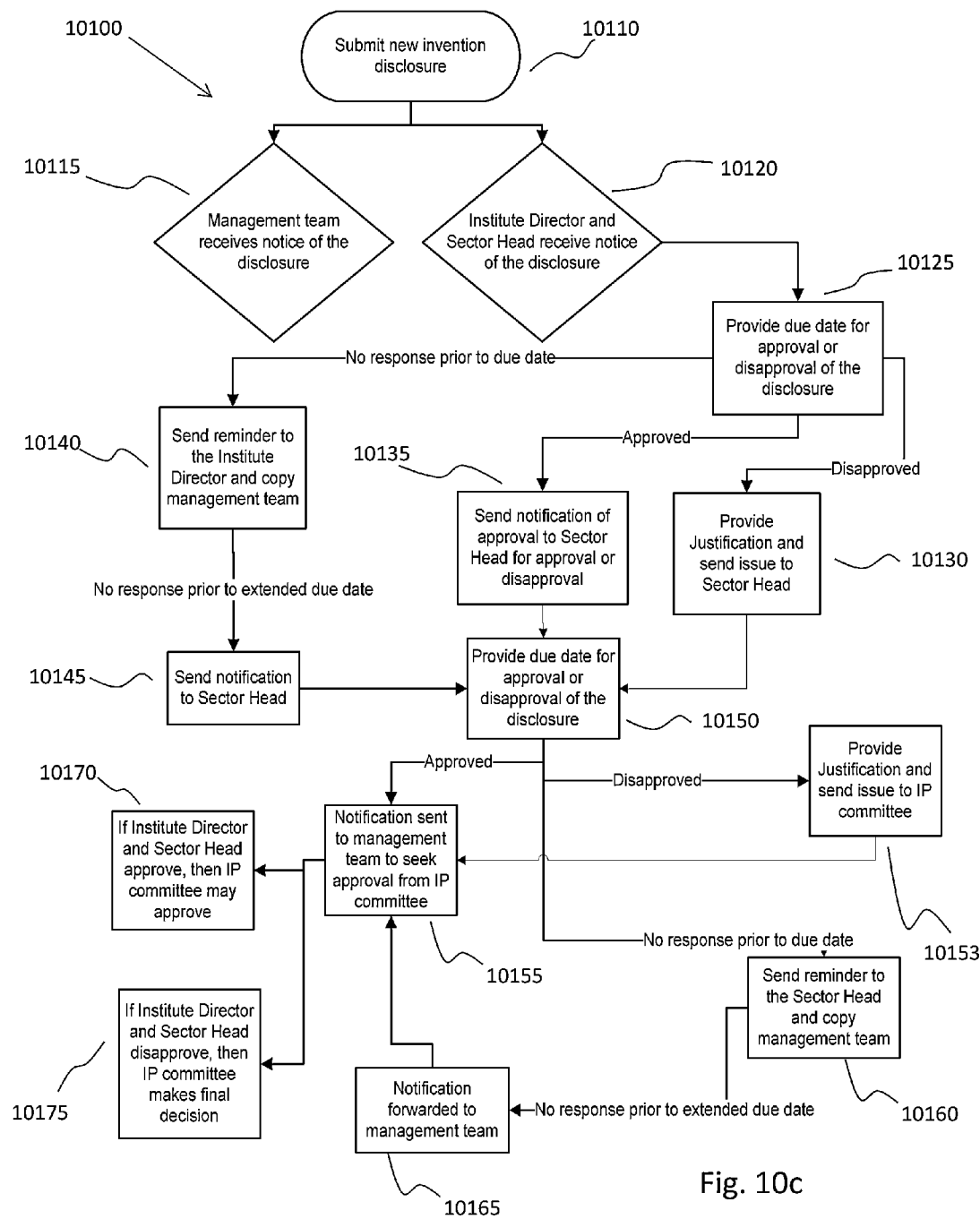
FIG. 10c is an illustrative process flow of implementing the system in accordance with aspects of the invention.

FIGS. 2, 3a, and 10c show exemplary flows for performing aspects of the present invention. The steps of FIGS. 2, 3a, and 10c may be implemented in the environment of FIG. 1, for example. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Overview of the System

FIG. 2 is a representative system overview and/or process flow of aspects of the present invention. As shown in FIG. 2, the invention process/system 100 begins at step 110 with the installation of the TIPPS system on a user's computing device. In embodiments, a user may install TIPPS software on the user's computing device, configure a connection with a TIPPS server, and initialize the setup of TIPPS applications on the user's computing device.

At step 120, the user may sign up for an account on the TIPPS system. In embodiments, the user can complete template forms in order to provide the user's name, email address, username, and TIPPS system password, as well as other pertinent information. Once the user has created an account, the user may log into the TIPPS system using their username and password, for example.

At step 130, the user may be able to conduct research on the TIPPS system using a search feature. In embodiments, the user may enter keywords into a search field in order to search content on the TIPPS system depending on privileges of the user. For example, the user may be able to enter keywords to search for relevant patents prior to filing a patent request. Once the research is completed, the user may begin the process of starting a new project. For example, the user may begin the process of preparing and filing of a new patent application.

At step 140, the user may start a new project on the TIPPS system. For example, the user may file a patent request for a new patent application by using the TIPPS system. In embodiments, the user enters a patent application title and the TIPPS system creates the new patent application including tasks required for completing the new patent application, and sends a notice to an administrator requesting role assignments for various team members to the tasks.

At step 150, an administrator may assign various team members to roles required for completing the tasks, and finishing the new project. In embodiments, the administrator may assign the user to the inventor role, select various team members as reviewers for the new patent application, and assign various team members as attorneys for the new patent application.

At step 160, the TIPPS system may send to the user and various assigned team members a notification of the assignment of the various team members to the tasks. This may be performed in various different manners such as, for example, an email or text message. Additionally, the user may be informed of the various tasks required for the completion of the new project. In embodiments, the user is able to view current tasks with due dates and requirements for completion of the tasks. In accordance with aspects of the invention, the user is able to use the TIPPS system to complete each task for completing the new patent application by completing template forms pertaining to the new patent application and uploading/downloading documentation in support of the new patent application.

At step 170, the tasks may be sent to various team members assigned as reviewers, and the reviewers may either approve or disapprove of the completed tasks. In embodiments, the reviewers receive notification to review a new task completed by the user, e.g., inventor, in support of their new patent application. In accordance with aspects of the invention, the reviewer reviews the completed task and can provide comments regarding the task, approve the task, or reset the task requiring that the inventor revise and/or complete and resubmit the task. Once the reviewer is satisfied with the completed task, the reviewer can approve and complete the task of review.

At step 180, the tasks completed by the inventor and reviewed by the reviewer may be forwarded to various team members assigned for final approval. In embodiments, the completed tasks are forwarded to management for final approval of the new patent application. In accordance with aspects of the invention, the management team members assigned to the task of final approval, receive notification of the task and may comment on the completed new patent application, accept the new patent application, and/or reject the new patent application.

At step 190, the user may receive notification on whether their new project was rejected or approved. For example, the user may receive notification on whether their new patent application was rejected or approved for filing. In embodiments, the new patent application is completed and the user may start a new patent application project by starting over at step 130.

The TIPPS System

FIGS. 3a-12q are related functions (shown as, for example, screen shots and flow diagrams) of the processes and systems pertaining to the invention process/system 100. Hereafter, the processes of FIG. 2 will be discussed in detail with reference to the FIGS. 3a-12q.

A. Installation (Step 110)

The TIPPS system is designed to work equally well on any Operating System. In embodiments, the TIPPS system can be implemented on Unix® operating systems (e.g., Linux, Darwin, BSD, etc.) as well as on Windows® operating systems (Unix being a trademark held in at least the United States by The Open Group, and Windows being a trademark held in at least the United States by Microsoft®.)

Figure 3B:
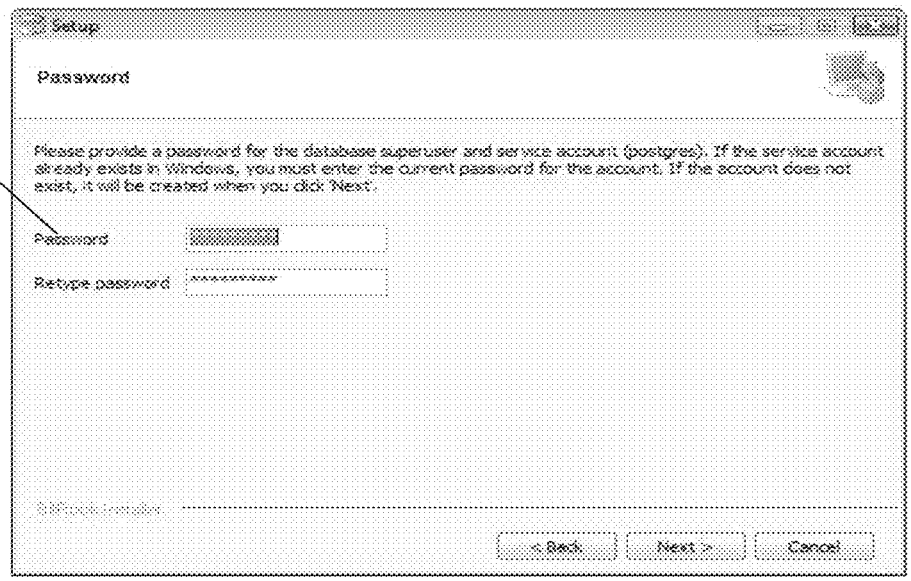

As shown is FIG. 3a, at step 310, the installation process starts by downloading a database server from an external source and installing and configuring the server to run on the user's computer, e.g., computing device 14, as discussed with respect to FIG. 1. In embodiments, the user may download and install a PostgreSQL Database server, e.g. the installation module 50, as discussed with respect to FIG. 1. In further embodiments, as shown in FIG. 3b, the user may need to establish a service account with an administrator of the database server and enter a password 3005 in order to install the server onto the user's computer.

Figure 3C:
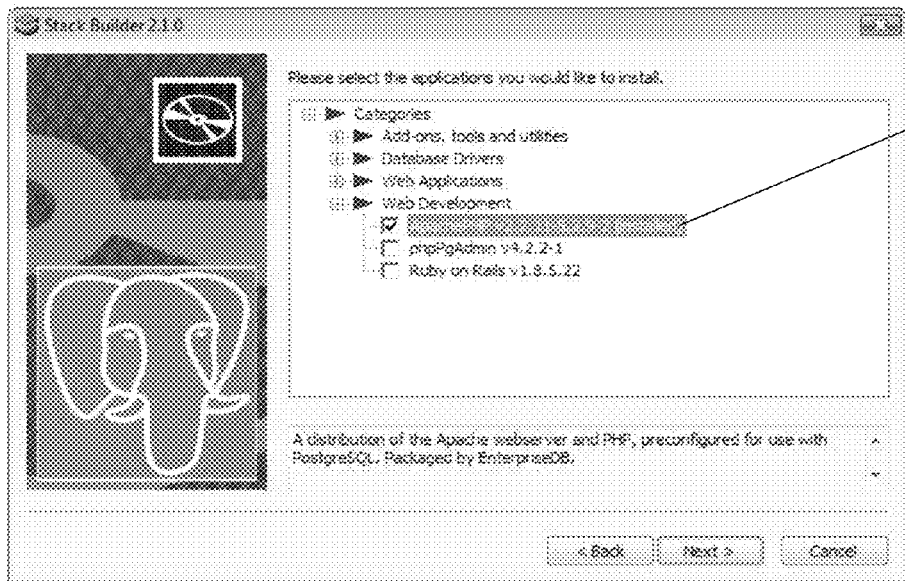

At step 310, during the installation of the server, the user may be presented with a stack builder window, as shown in FIG. 3c, and the user may select an appropriate server and application for installation. For instance, as shown in FIG. 3c, the user has selected the PostgreSQL Database server and the ApachePHP 3010 application for installation, although other servers are also contemplated by the present invention.

At step 320, the user may connect with the server once the application is downloaded and installed. At step 330, the user may download TIPPS source code from the server and install the TIPPS system on the user's computing device. As shown in FIG. 3d and in accordance with aspects of the invention, the user may download TIPPS source code 3015, unpack a zip file 3020, and move content from the TIPPS folder to a program file for installation of the TIPPS system.

At step 340, the TIPPS source code may be initialized. For example in accordance with aspects of the invention, a new database may be initialized from the TIPPS source code. In embodiments, the user may have control over what to name certain features of the TIPPS system. For example, from a start administrative page of a PostgreSQL start menu the user may connect to the PostgreSQL Database server. In order to connect to the PostgreSQL Database server the user may again be required to input a password. For example, the same password 3005 may again be required to continue with the initialization.

During the initialization process, a user may select a Login Roles node and selecting New Login Role may create a new TIPPS role. Further, the user may name the Role Name using an interface. As shown in FIG. 3e, selecting a Database node and selecting a new database creates a new TIPPS database 3025. Further, a user may name 3030 the new database and select the new TIPPS role for the owner 3035 of the database.

The new database may then be initialized. In accordance with aspects of the invention and as shown in FIG. 3f, an SQL Shell 3040 is started from the PostgreSQL start menu. In embodiments, the user may log in to the server on a localhost 3045. For example, the user may log in with the new TIPPS database name 3030, new TIPPS role for the owner 3035, and the same password 3005. The user may subsequently select a correct program file and the initialization may be completed.

Figure 3G:
Figure 3H:
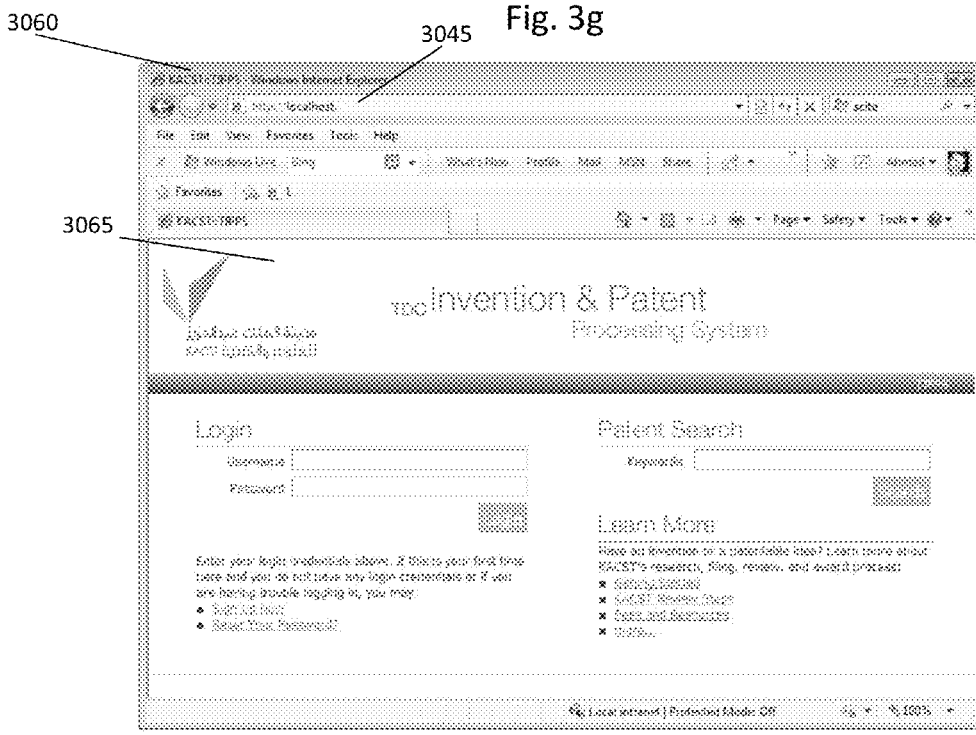

At step 350, the TIPPS system is configured using any conventional text editor 3050, as shown in FIG. 3g. For example, the correct program file may be opened using the text editor 3050, and the connection string 3055 may be modified to complete the connection configuration. In embodiments, the user may now open any conventional browser 3060 to the localhost 3045 and the TIPPS system website 3065 may be displayed to the user, as shown in FIG. 3h. The website 3065 may, for example, comprise a login section, a patent search section, and a learn more section.

B. TIPPS System Sign-Up (Step 120)

Figure 4A:
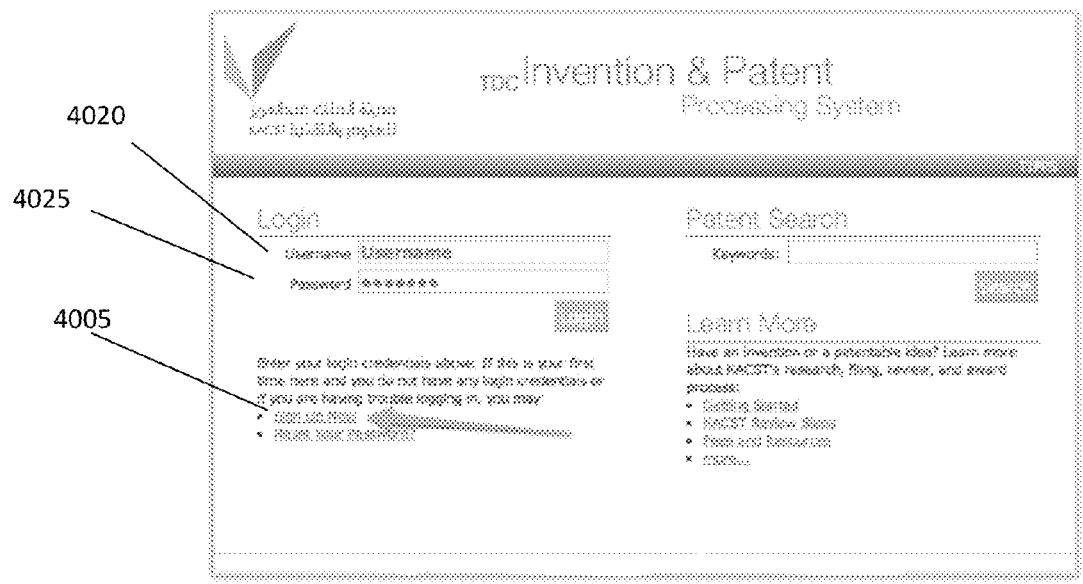

Prior to a user being able to start the process of preparing and filing a new patent application, e.g., a new project, the user may sign-up for an account on the TIPPS system using the user module 50, as discussed with reference to FIG. 1. As shown in FIG. 4a, in embodiments, the user may select from the TIPPS system website 3065, as discussed above with reference to FIG. 3h, a link that may forward the user to an account sign-up form. For example, the link may be a "Sign Up Now" link 4005. A shown in FIG. 4b, the user may input into a sign-up interface 4010, a name 4015 of the user, a username 4020, a password 4025, a confirmation 4030 of the password 4025, and an email address 4035. In embodiments, the username 4020 may be the email address 4035.

In further embodiments, the user may also be requested to complete a security feature to ensure that the sign-up process is not being performed by an automated script. For example, the user may be requested to complete a phrase 4040, e.g., reCaptcha® phrase (reCaptcha being a trademark held in at least the United States by Carnegie Mellon University.) In accordance with aspects of the invention, the user may accept 4045 terms of service 4050 of using the TIPPS system and the sign-up process may be completed.

Figure 4B:
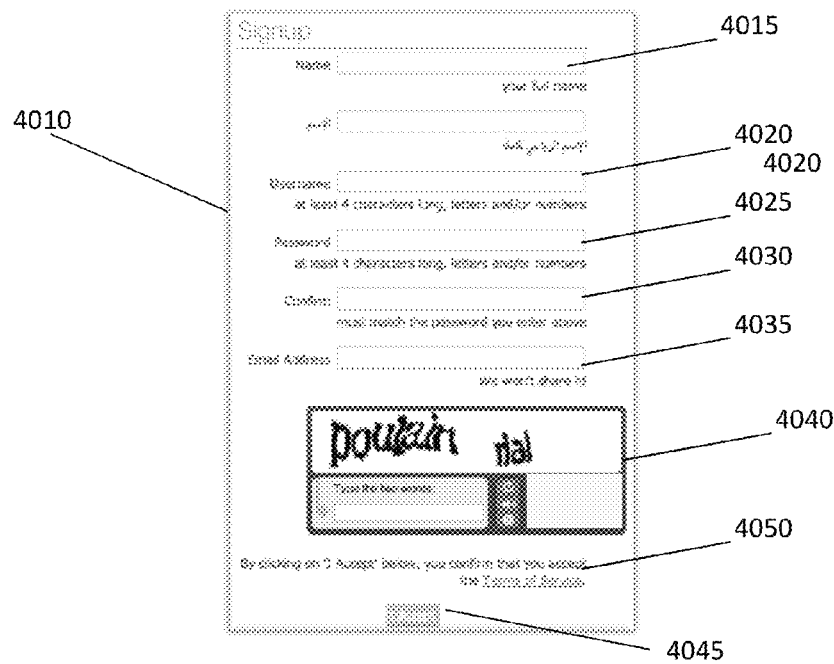
Figure 4C:
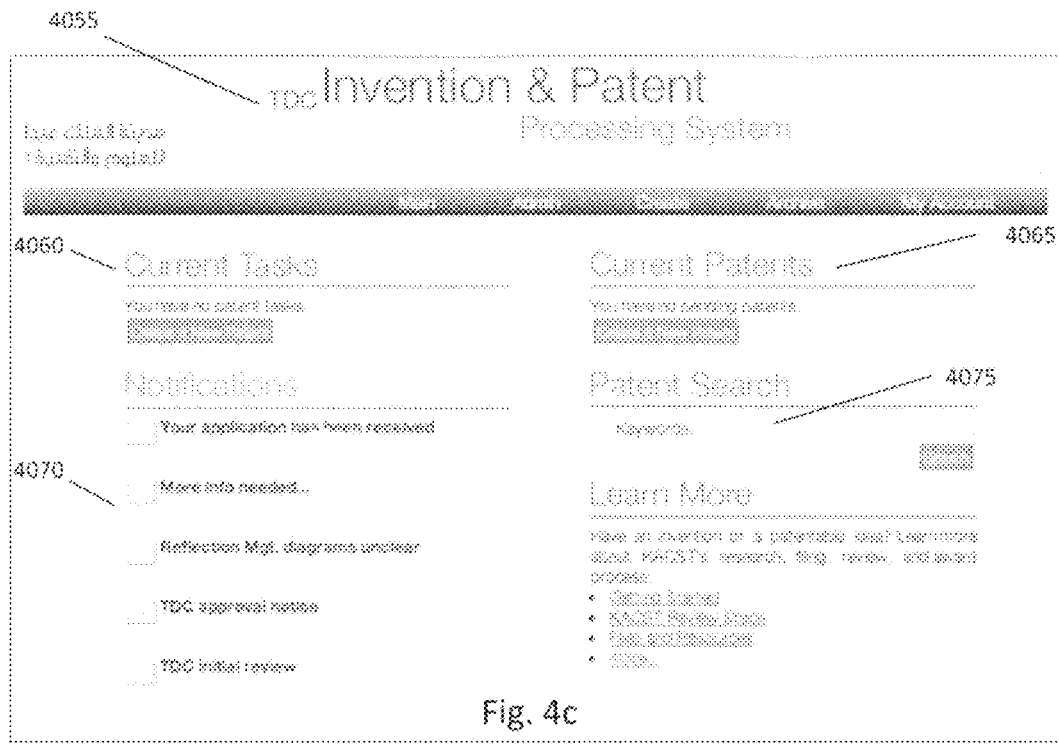

The user may now log into the TIPPS system website 3065 using the username 4020 and the password 4025 previously input in the sign-up process, as shown in FIG. 4a. When the user logs into the TIPPS system, the main page 4055 may be displayed to the user, as shown in FIG. 4c. In embodiments, the main page 4055 may comprise a current task list 4060, a current patents list 4065, a notifications list 4070, a patent search tool 4075, and a learn more section.

In accordance with aspects of the invention, the current tasks list 4060 shows the user task that needs to be performed. For example, the current tasks list 4060 may show the most urgent tasks that need to be performed, sorted by their due date. These tasks may include, for example, completing the initial disclosure form, providing a description and commercial potential documents, background search documents, explanation of the invention, copies of notebook pages, sign in information and approval for filing, amongst other items. The current patents list 4065 may show the patent applications that the user is a member thereof. For example, the current patents list 4065 may show the user the most urgent patent applications in which the user is a member, sorted by their task due dates. The notification list 4070 may show the user any notifications that may have been received. For example, the notification list 4070 may show the user the latest notifications received. The patent search tool 4075 may enable the user to conduct searches. For example, the patent search tool 4075 may search the contents of the TIPPS system. The learn more section may include, for example, help regarding getting started with the TIPPS system, review steps, and fees and resources.

C. Patent Research (Step 130)

Figure 5A:
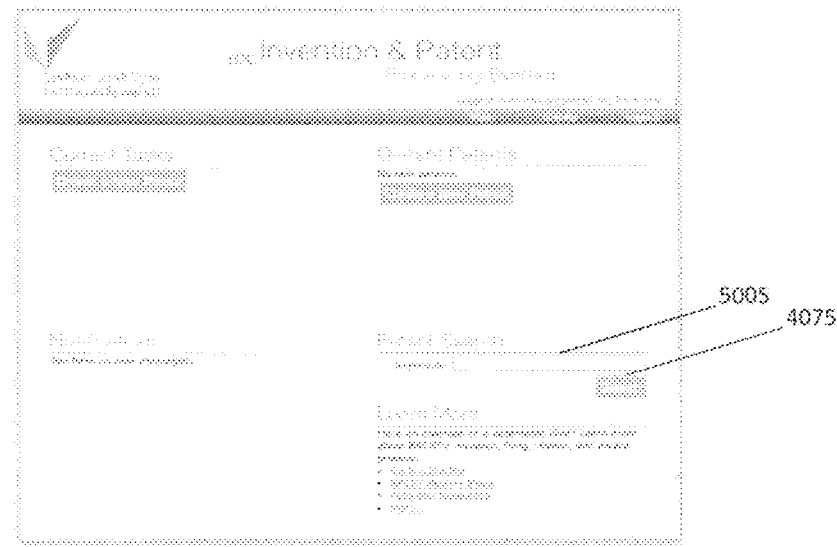

The TIPPS system encourages that users perform research prior to starting a new patent application. As shown in FIG. 5a, the user is able to search the TIPPS system for relevant material using the patent search tool 4075, as discussed with reference to FIG. 4c. In embodiments, the user may enter a keyword 5005 that the user may think would appear in a relevant document. In further embodiments, the patent search tool may be AND based such that the more keywords 5005 that the user enters the narrower the search results may be.

In embodiments, the patent search tool 4075 used to search the TIPPS system may perform the search, dependent upon privileges of the user. For example, a patent application that is in progress may only be searchable by a signed-in member or administrator. In other words, the public may not be able to search a patent application that is in process. Additionally, a patent application that has been awarded to an inventor may only be searchable as far as the Title & Abstract are concerned for the public and a signed-in user. Whereas, an administrator may have full access to search the entire disclosure of the patent application awarded. Furthermore, tasks may only be searchable by signed-in users and administrators, whereas, the public may not be able to search the tasks.

Figure 5B:
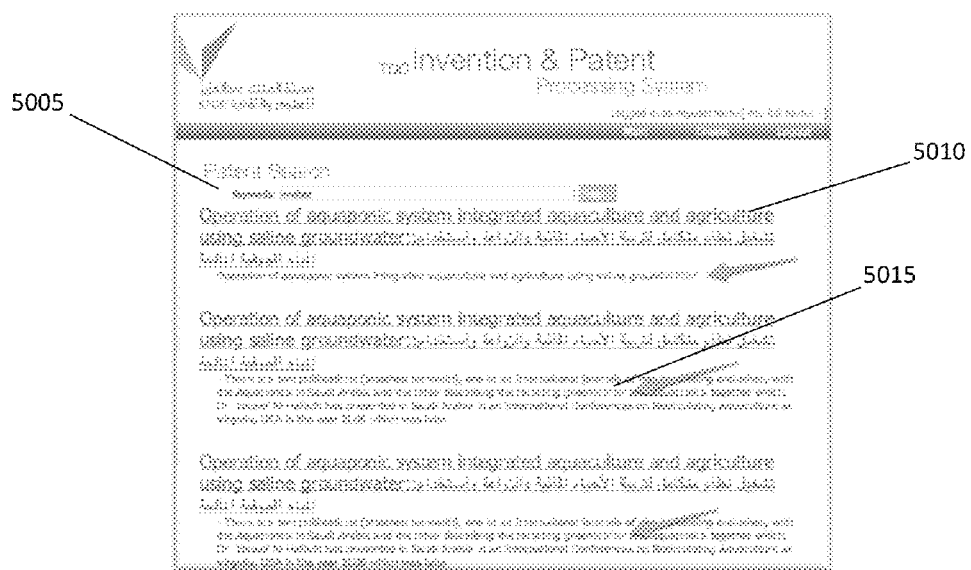

In accordance with aspects of the invention and as shown in FIG. 5b, the patent search tool 4075 may provide a listing of relevant results 5010 based on the input keywords 5005 such that the user can conduct research on materials provided on the TIPPS system. In embodiments, the keywords 5005 used in the search may be highlighted 5015 in the listing of the relevant results 5010. In further embodiments, the search may be conducted using any desired language or combination thereof such as, for example, both Arabic and English keywords 5005.

D. Filing a Patent Request (Step 140)

Figure 6A:
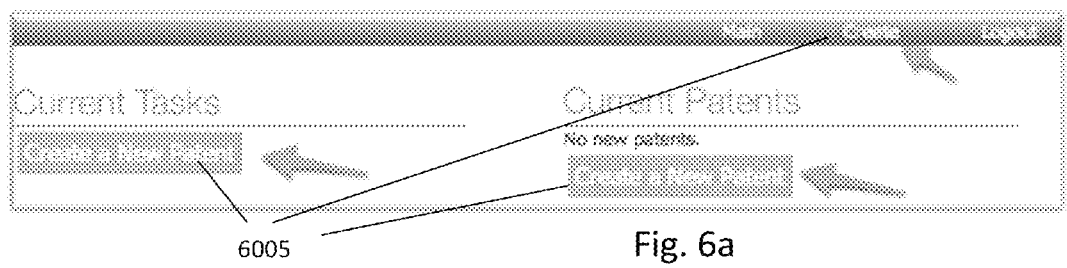
Figure 6B:
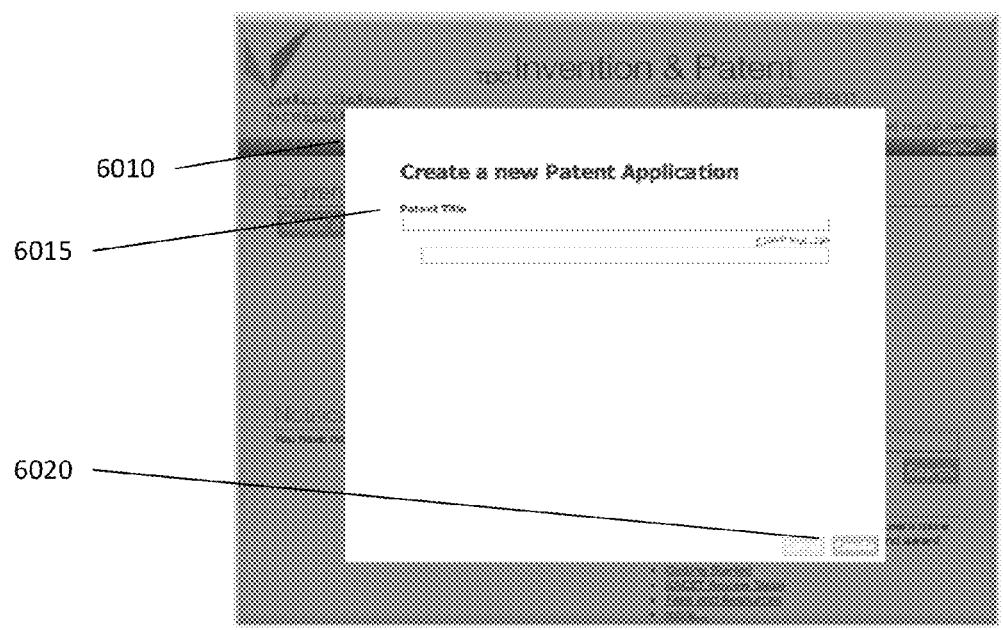

The TIPPS system may present a number of options for starting a project. As shown in FIG. 6a, the user may select a number of links or drop down boxes to start the process of a new patent application, e.g., new project. In embodiments, the user selects a "Create a New Patent" link to start the process of filing a new patent application. Once the user selects one of the number of options for starting the new patent application, a dialog box 6010 may be presented that requests the user to input a title 6015 for the new patent application, as shown in FIG. 6b. The user may enter the new patent application title 6015 and select the "Create" button 6020 in order to have the TIPPS system generate the new patent application.

Figure 6C:
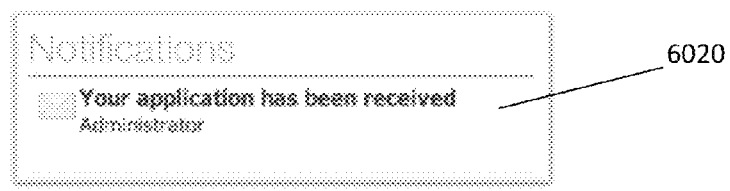

Once the new patent application request has been sent, the TIPPS system may generate and send a notification 6020 to the user, as shown in FIG. 6c. The notification 6020 may include, for example, the name and/or role of whomever sent the notification and the date of the notification. The notification 6020 may be received in the notification list 4070, as discussed with reference to FIG. 4c. In embodiments, the user that creates the new patent application may automatically be assigned as the inventor of the new patent application by the TIPPS system. In further embodiments, for the new patent application process to begin, an administrator may assign additional role handlers to the new patent application. An administrator may be anyone who signs up to be an administrator of the TIPPS system, as discussed in further detail below under the Administration heading. The role handlers may be team members that may play a role in completing the new patent application process, e.g., project.

E. Role Handlers Assignment (Step 150)

In embodiments, once a new patent application is created in step 140, the new patent application may not be made available to anyone in the TIPPS system until the administrator assigns role handlers to the new patent application. In further embodiments, the act of assigning roles to the new patent application may trigger the new patent application availability.

Figure 7A:
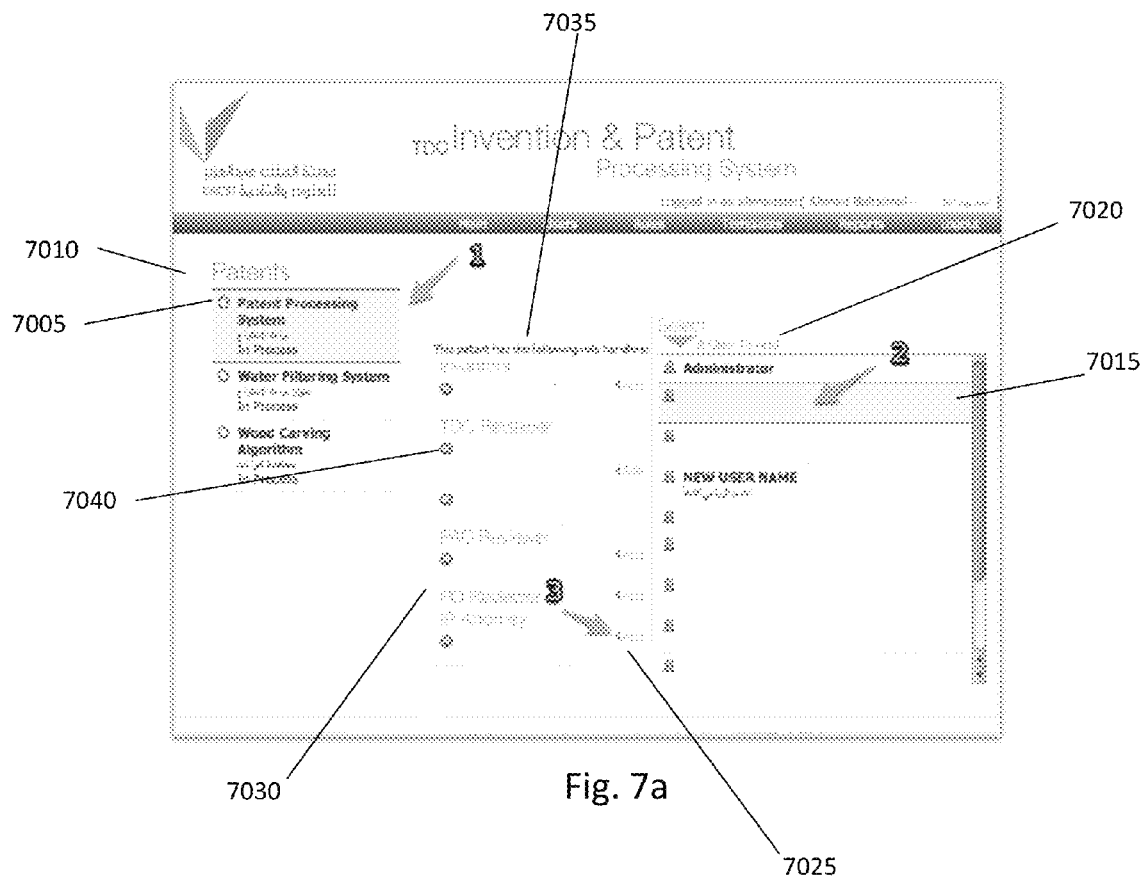

As shown in FIG. 7a, assigning role handlers to the new application may involve a three-step process. For example, first, a new patent application 7005 requiring role handler assignment may be selected from a list 7010 of available new patent applications. Second, a user and/or member 7015 of the TIPPS system may be selected to participate in the new patent application as a role handler from a user list 7020. In embodiments, the selection of the user and/or member 7015 may result in an "Add" sign 7025 being displayed next to each role 7030 in the role list 7035. Third, the "Add" sign 7025 next to the role 7030 may be selected for the role 7030, which the user and/or member 7015 should play in this new patent application.

In accordance with aspects of the invention, a role handler, e.g., user and/or member 7015 assigned to a role 7030, may be removed from a role 7030 by selecting a button 7040 adjacent the role handler's name. In embodiments, all role assignments and removals may automatically result in the TIPPS system sending a notification to all users and/or members 7015 assigned to a role 7030 in the new patent application, as discussed in detail below.

Figure 7B:
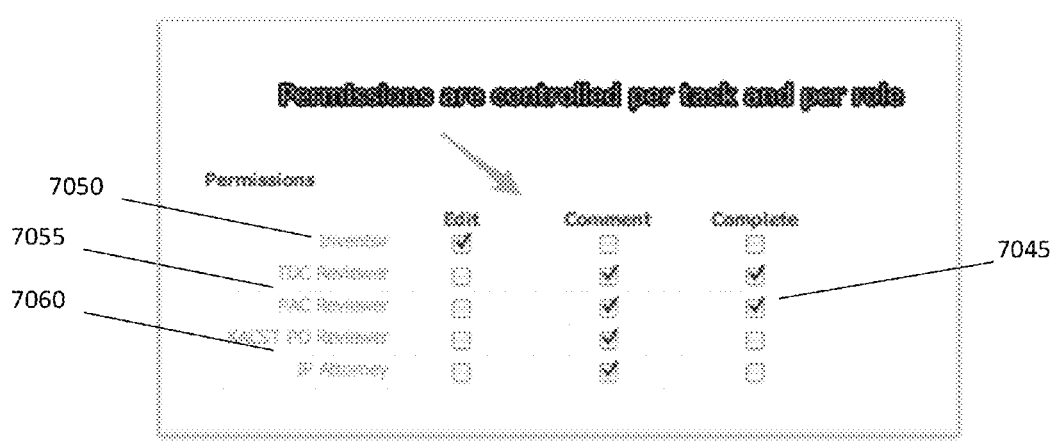

In embodiments, permissions for actions may be controlled per each task and per each role of the role handlers. As shown in FIG. 7b, for a given task, a check box system 7045 may be used to designate permissions for different actions that each role may be able to perform for the given task. For example, for the task permissions illustrated in FIG. 7b, the inventor 7050 may only be able to edit task submissions. The TDC reviewer 7055 may only be able to comment and/or complete review of the submitted task, whereas, the PO reviewer and attorney 7060 may only be able to comment on the submitted task. Other combinations are also contemplated by the present invention, depending on such selections.

F. Task Submissions (Step 160)

Figure 8A:
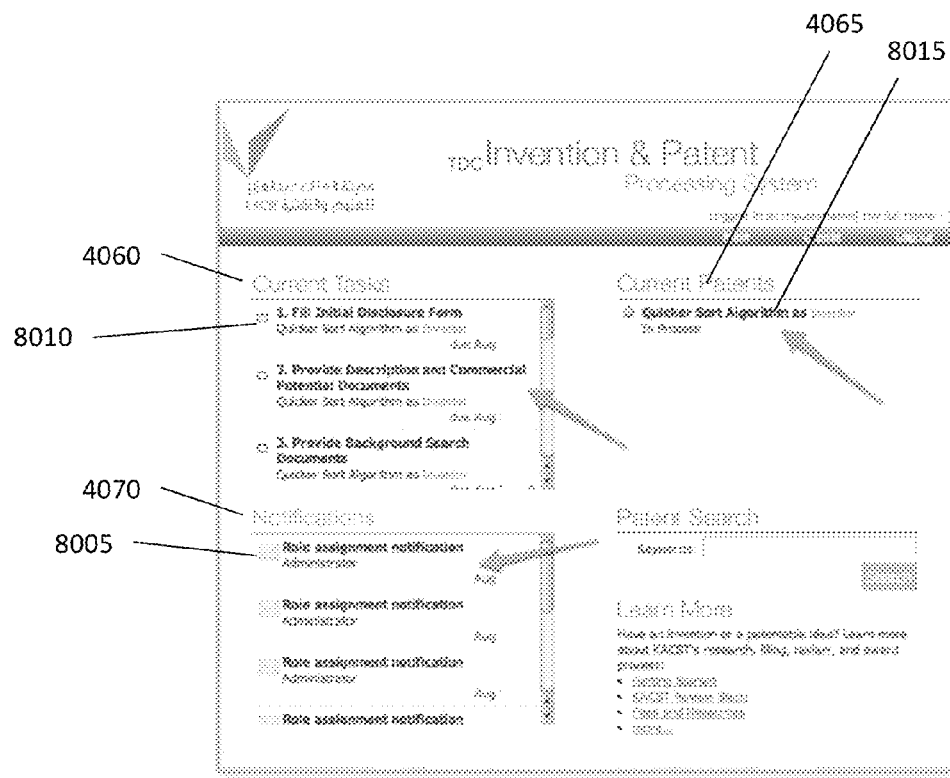

In accordance with aspects of the invention, once the role handlers are assigned to the new patent application, the user may receive a notification 8005 in the notification list 4070, a shown in FIG. 8a. Additionally, in embodiments, the task list 4060 may display current tasks 8010 required for proceeding with the new patent application, and the patent list 4065 may display the new patent application 8015.

Figure 8B:
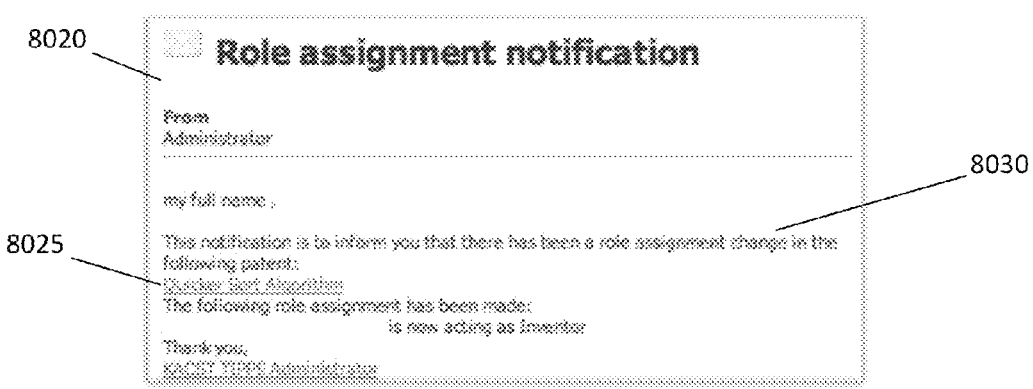

In embodiments and as shown in FIG. 8b, for each role assignment or removal, the user may also receive an email notification 8020 at the email address 4035, as discussed with reference to FIG. 4b. The email notification 8020 may comprise, for example, the name and/or role of the sender of the email notification, a link 8025 to the new patent application 8015, and an explanation 8030 of the changes that have occurred.

Figure 8C:
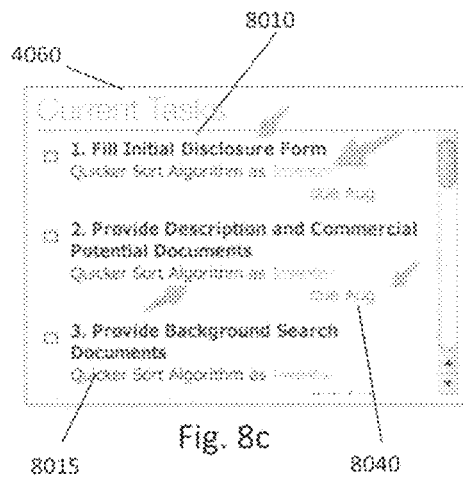
Figure 8D:
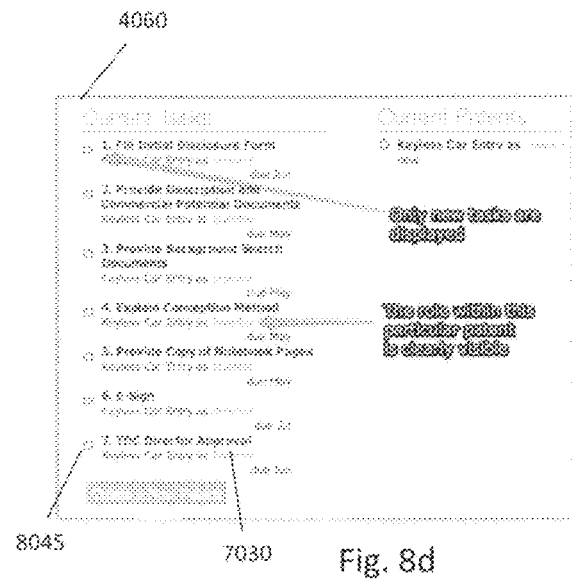

In accordance with aspects of the invention and as shown in FIG. 8c, the task list 4060 may display the current tasks 8010 in order of due date, the new patent application process, e.g., the new patent application 8015, the task belongs to, and a due date 8040 for the user to perform an action on the current tasks 8010. In further embodiments and as shown in FIG. 8d, the task list 4060 may also display the role 7030 assigned to the current tasks 6030 and may display only new tasks 8045.

Figure 8E:
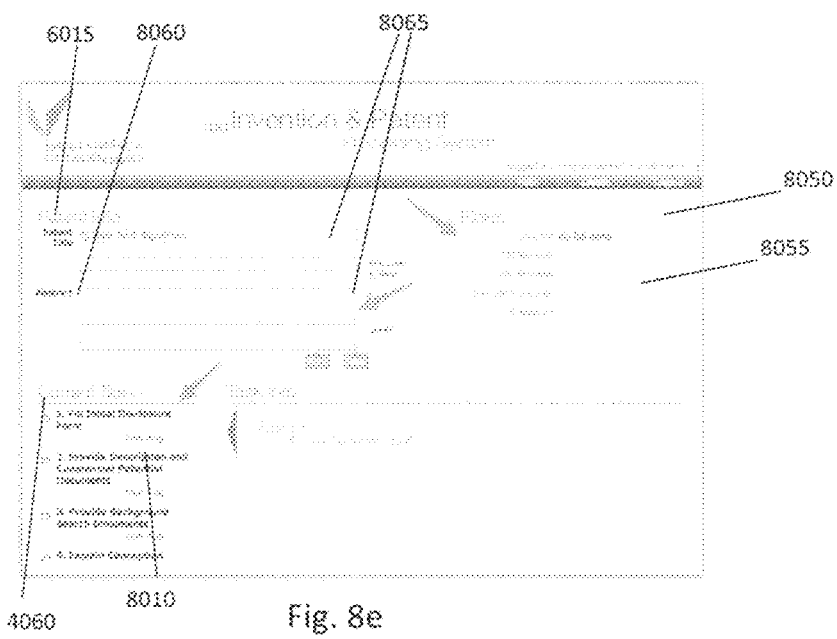

In embodiments, selecting the new patent application 8015 from the patent list 4065 may display a patent page 8050, as shown in FIG. 8e. In embodiments, the patent page 8050 may display the role handlers 8055 assigned to the new patent application, the new patent application title 6015 and an abstract 8060, and the task list 4060. For example, the roles and names of the users and/or members assigned to the roles can be, e.g., role handlers 8055. The role handlers may include, for example, administrators, attorneys, inventors, supervisors, etc. Furthermore, the new patent application title 6015 and the abstract 8060 may be displayed in text boxes 8065 such that the title 6015 and the abstract 8060 may be edited. In embodiments, the title 6015 and the abstract 8060 may be edited in any appropriate language such as, for example, both Arabic and English. In addition, the task list 4060 may be used to display the currents tasks 8010 to be performed by the user and the other role handlers of the new patent application. For example, these tasks may include providing commercial potential of the invention, background search documents and/or a description of the invention, to name a few.

Figure 8F:
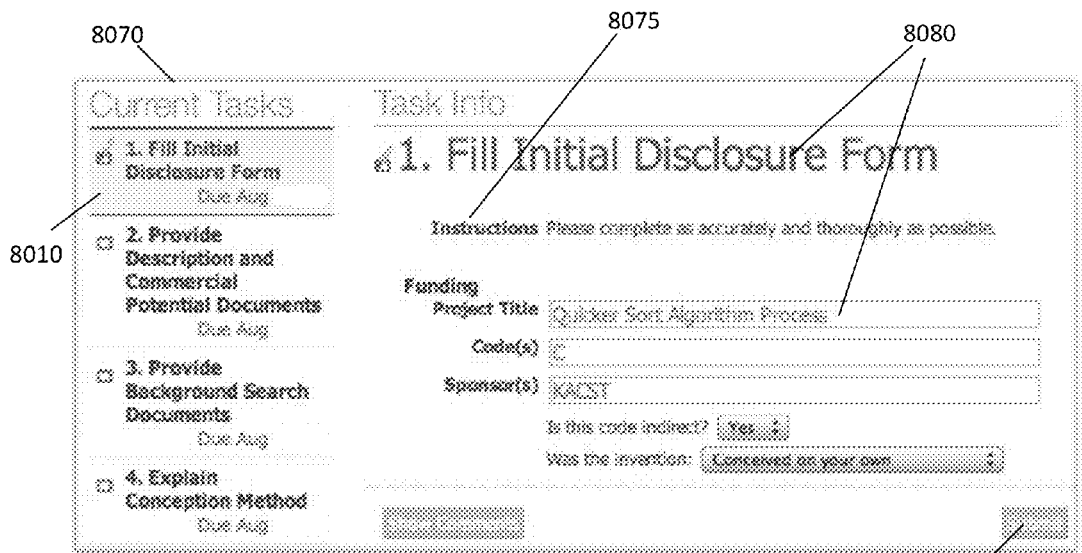

In embodiments, tasks may be completed by selecting the current tasks 8010, which may open up a dialog box 8070, as shown in FIG. 8f. For example, by selecting the current task of "Fill Disclosure Form", the appropriate dialog box 8070 will open. In embodiments, the dialog box 8070 may contain instructions 8075 for performing an appropriate action 8080 to complete the current task 8010 and a comment link for reading any comments pertaining to the appropriate action 8080. The appropriate action 8080 may include, for example, input fields and drop down menus for inputting information pertinent to the appropriate action 8080. In accordance with aspects of the invention, the appropriate action may depend on the role that the user is handling with regard to the new patent application. For example, in this example, the inventor may complete this dialog box 8070. In embodiments, the TIPPS system may auto-save the contents of the dialog box 8070 transparently for the user as the user fills out the appropriate action 8080. Thus, the auto-save feature may prevent data-loss when filling out long and/or complicated tasks.

Figure 8G:
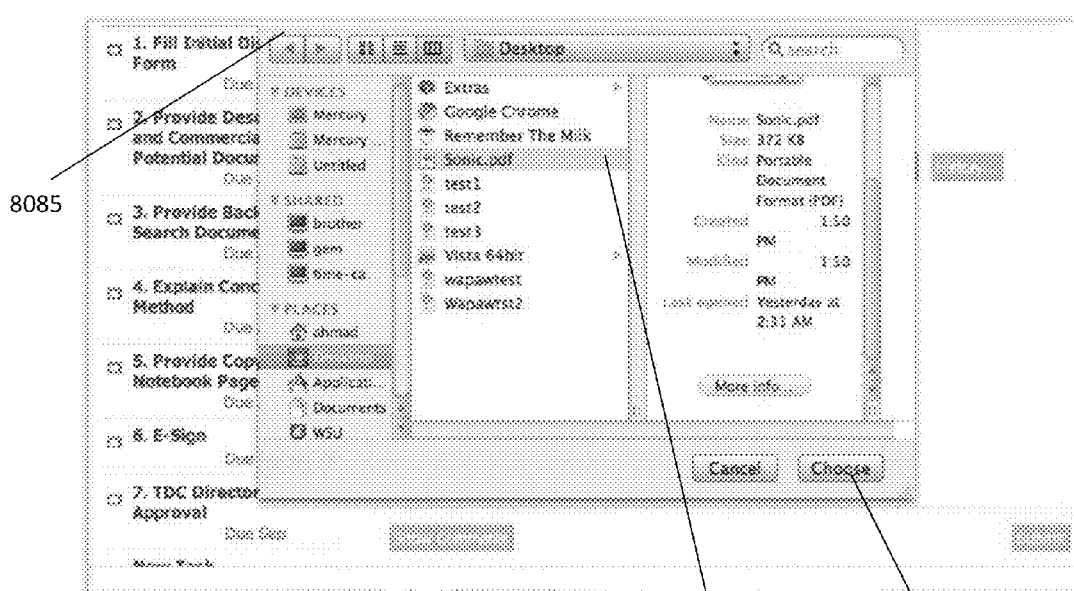
Figure 8H:
Figure 8I:
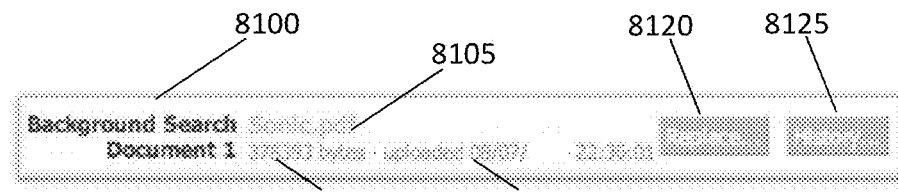

In further embodiments, the current tasks may require that files be uploaded, e.g., additional documentation supporting the new patent application, such as lab notebooks, in order to complete the current tasks 8010. As shown in FIG. 8g, the TIPPS system may comprise a file handling mechanism 8085 for uploading such additional documentation. For example, the current tasks 8010 may include placeholders 8090 to upload as many files as required in order to complete the current tasks 8010, as shown in FIG. 8h. In accordance with aspects of the invention and as shown in FIG. 8g, the user may select the file 8095 for upload and select a button 8097 to upload the file 8095. In alternative embodiments, the TIPPS system may automatically detect that the file 8095 was selected by the user and automatically initiate the upload. However, once the upload is completed, information 8100 regarding the file uploaded may be displayed to the user along with a link 8105 to download the file, as shown in FIG. 8i. In embodiments, the file size 8110 and/or upload time stamp 8115 may also be displayed.

Figure 8J:
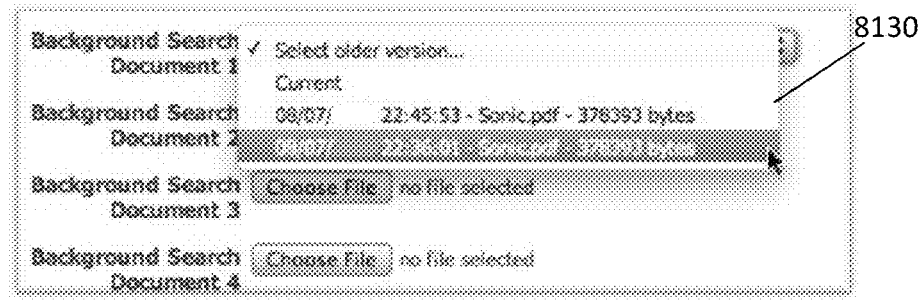
Figures 8K, 8L:
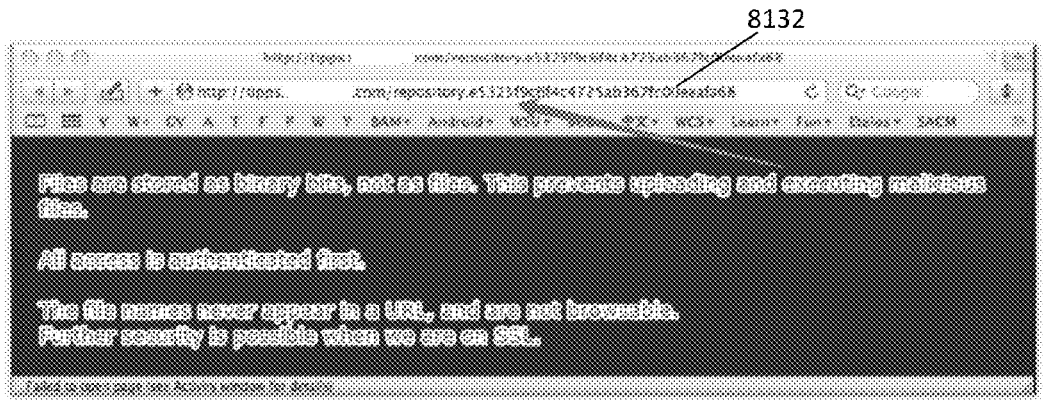

In further embodiments, the user may upload a replacement file by selecting a replacement button 8120, as shown in FIG. 8i. In accordance with aspects of the invention, the TIPPS system may save the old copy of the file upon uploading a replacement file. For example, the user may select a history button 8125 to display a file version selector 8130, as shown in FIG. 8j. From the file version selector 8130 the user may select any version of the file that they may want to download. In embodiments, files are stored as binary bits, and not as files. This may prevent uploading and executing malicious files. Furthermore, all access may be authenticated first. As shown in FIG. 8k, the file names appear as binary numbers 8132 in a URL and may not be browsable.

Figure 8M:
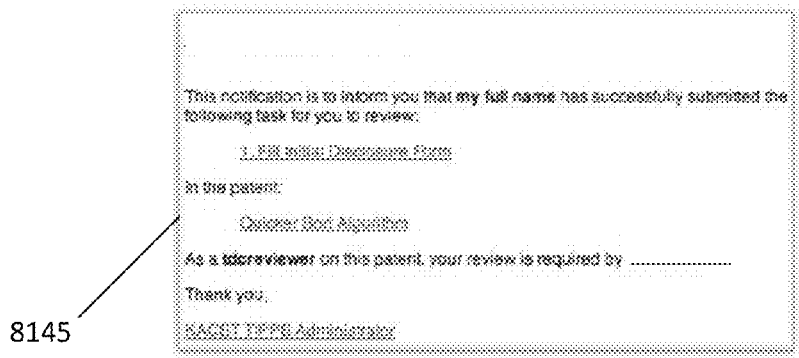

Referring again to FIG. 8f and in accordance with aspects of the invention, once the appropriate action 8080 is filled in, the files 8095 are uploaded, and the current tasks 8010 is completed, the user may select a link 8135 to submit the current tasks 8010. In embodiments, the current task 8010 may be updated with an icon 8140 to signify that the current task 8010 has been completed and submitted, as shown in FIG. 8l. In further embodiments, upon submission of the current tasks 8010, the TIPPS system may perform updates to the task list and send notifications to the other role handlers assigned to the new patent application that the current tasks 8010 has been completed. For example, the TIPPS system may update the due date 8040 of the tasks remaining in the task list by a number of days that the administrator may have set for the user. Furthermore, the TIPPS system may send a notification 8145 to the other role handlers assigned to the new patent application informing them that the user has filled and submitted the current tasks 8010, as shown in FIG. 8m. The notification 8145 may include, for example, the name and/or role of the sender of the notification, the name of the task completed for review, the name of the new patent application associated with the completed task, and a due date for completing the review.

G. Task Reviews (Step 170)

Figure 9A:
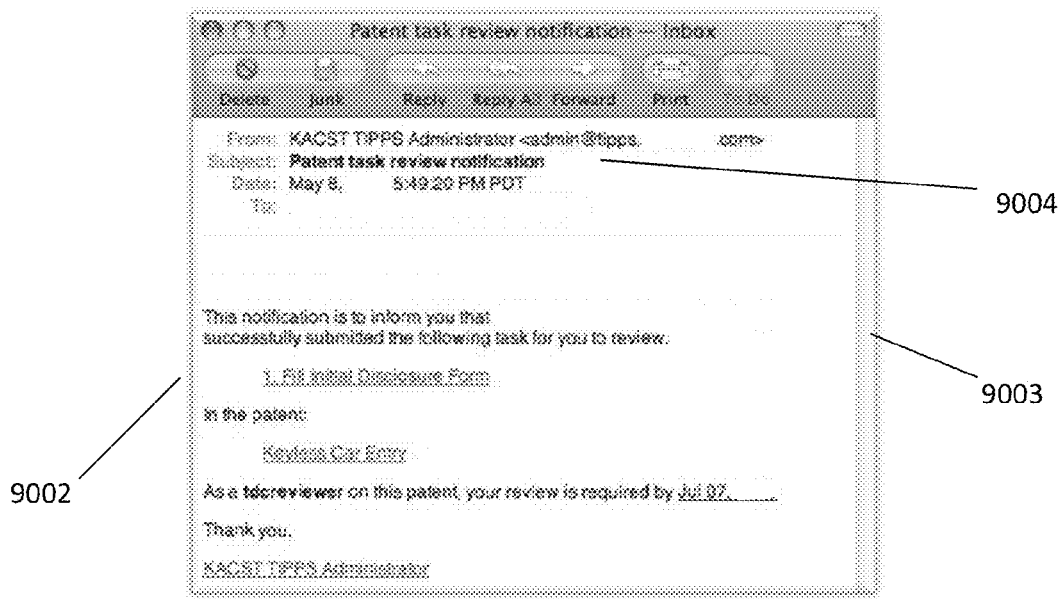

In accordance with aspects of the invention, upon completion of a task in step 160, a reviewer may be tasked with reviewing the contents of the task. For example, upon completion of the task 8080, a reviewer may be requested to review the appropriate action 8080, submitted in the current task 8010. In embodiments, the reviewer may have received the notification 8145 and an additional notification 9002 via email, as shown in FIG. 9a, which informs the reviewer that they have a new task available. For example, as shown in FIG. 9a, a reviewer, e.g., administrator may be provided with a notification that an inventor has submitted for review a patent application, entitled, for example, keyless car entry. The dialog box 9003 shown in FIG. 9a may include email header information 9004 such as, "to", "from", "subject" and "date" fields.

Figure 9B:
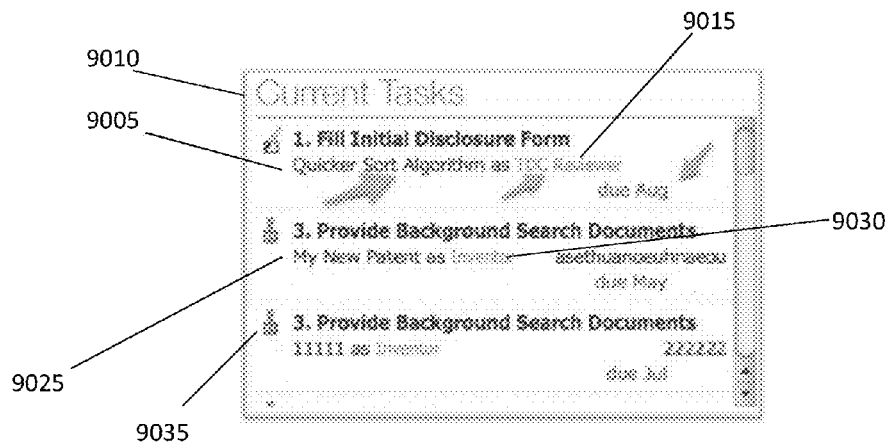
Figure 9C:
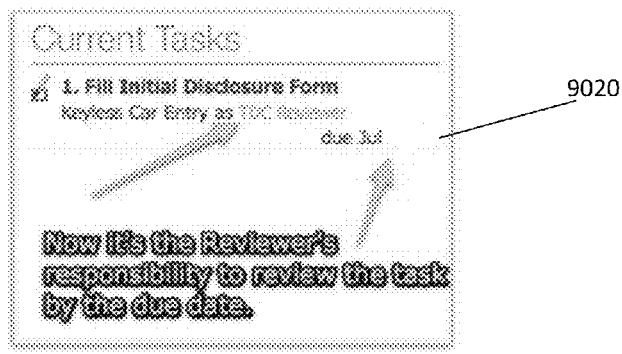

In embodiments, a reviewing task 9005 may be displayed in the reviewer's task list 9010, as shown in FIG. 9b. In accordance with aspects of the invention, the reviewer's role 9015 may be displayed along with the reviewing task 9005. In embodiments, the due date 8040, as discussed with regard to FIG. 8c, may be updated with a new due date 9020 to provide the reviewer time to review the contents of the current task 8010, as shown in FIG. 9c.

In embodiments, it is to be understood that the reviewer may play different roles in other patent applications. For example, the reviewer may also play the role of an inventor in other patent applications, and the tasks 9025 associated with that role 9030 may be displayed in the reviewer's current task list 9010, as also shown in FIG. 9b. In further embodiments, an alert signal 9035 may be displayed next to tasks that are past the due date for completion.

Figure 9D:
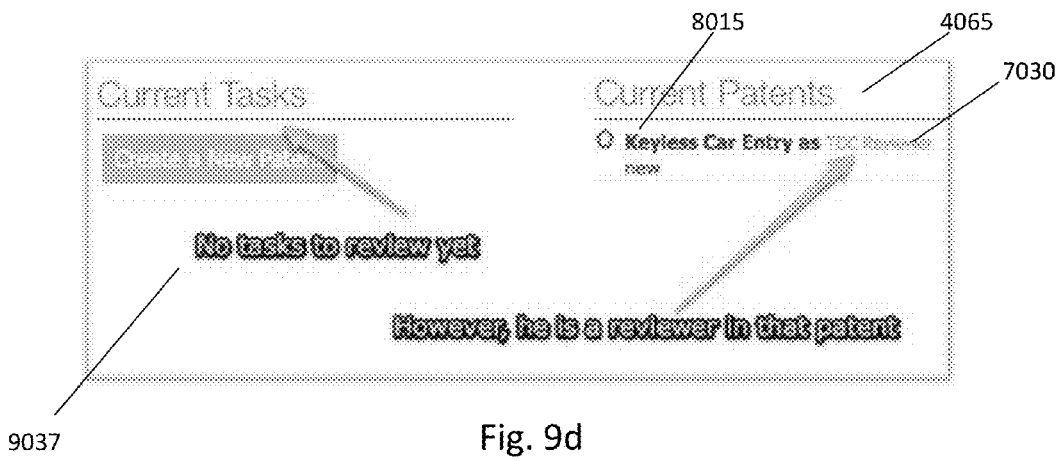

As shown in FIG. 9d, the reviewer may not necessarily have any tasks 9037 to review. Furthermore, in embodiments, the current patents 4065 may also display the role 7030 assigned to the new patent application 8015.

Figures 9E, 9F, 9G:
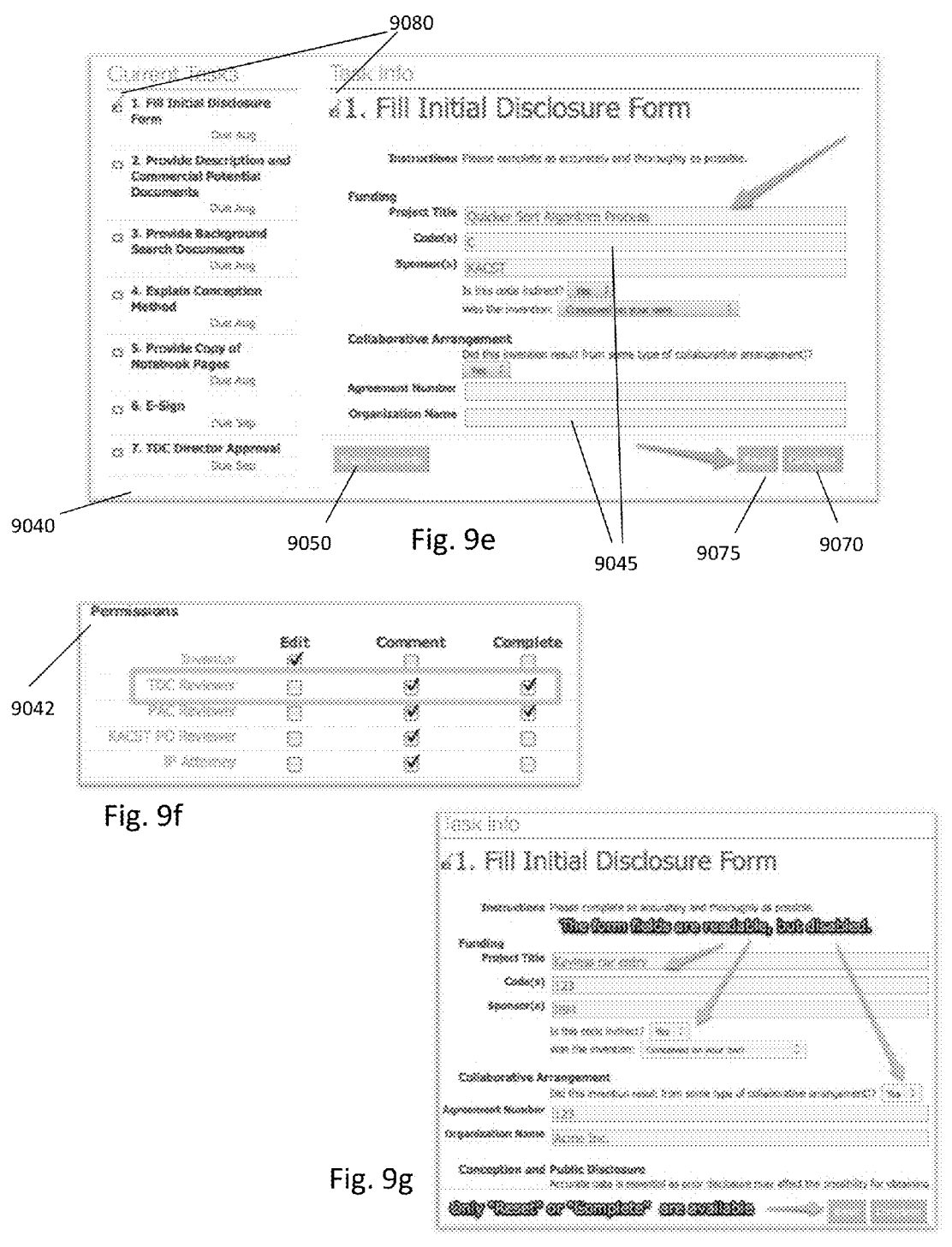

In accordance with aspects of the invention and as shown in FIG. 9e, the reviewer may select the reviewing task 9005 in order to open a dialogue box 9040 for completion of the reviewing task. In embodiments, all of the input text boxes 9045 may be disabled for editing. For example, the reviewer may only have permissions 9042 to comment, reset, and complete, e.g., view, copy, and examine, all of the data submitted in the task, as shown in FIGS. 9f and 9g. The user may not be able to edit anything in the submitted task.

Figure 9H:
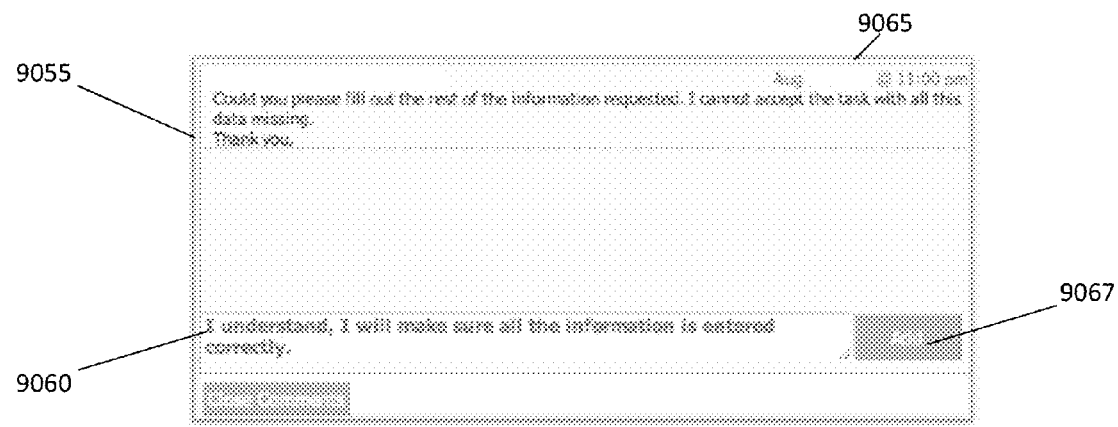

In embodiments, the reviewer may be able to add comments to the submitted task. For example, the reviewer may be able to select a comment button 9050 in order to display, add, and/or respond to comments related to the submitted task. As shown in FIG. 9e, selection of the comment button 9050 may open a dialogue box 9055 enabling the reviewer to add a comment 9060, as shown in FIG. 9h. In embodiments, the comment may be time stamped 9065 and include the name and/or role of the comment creator. In order to reply to a comment, the user may simply select an add comment button 9067. In embodiments, the submission of a comment is provided to all role handlers assigned to the new patent application. Advantageously, the TIPPS system provides the comment process in order to enable precise and documented communication between the role handlers working on the new patent application. For example, any role handler assigned to a new patent application may be able to create, display and respond to comments posted on each task. The comments may be task specific, which enables role handlers to narrow their comments to each particular task.

In embodiments, if a comment exists for a task that has been recently opened, e.g., selecting the reviewing task 9005, then the comment button 9050 may flash for a predetermined amount of time, e.g., 10 seconds. This advantageously, informs the user in an unobtrusive manner that a comment exists for the opened task.

Referring again to FIG. 9e and in accordance with the role of the reviewer, once the reviewer has finished their review of the task they may be able to complete or reset the task. In other words, the reviewer may be able to confirm that the task is completed sufficiently (by selecting a button 9070 for completion, e.g., "completed") or send the task back (by selecting a button 9075 for returning the task to the user, e.g., "reset") for further information or changes.

Figure 9I:
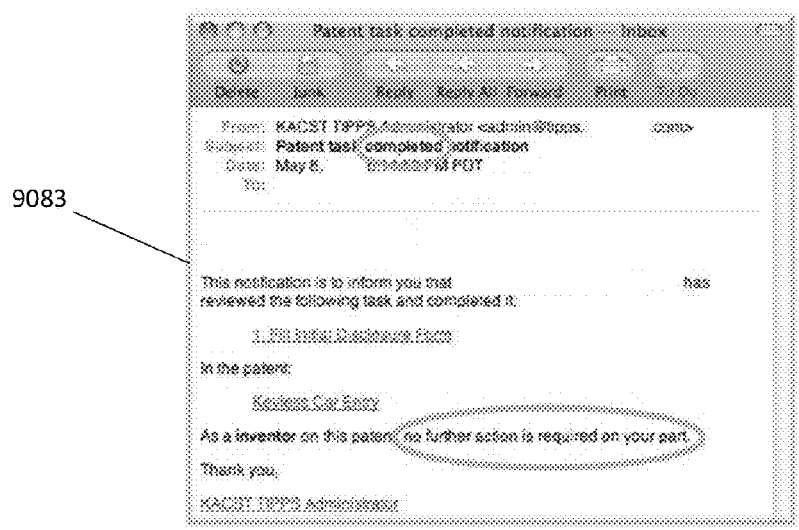
Figure 9J:
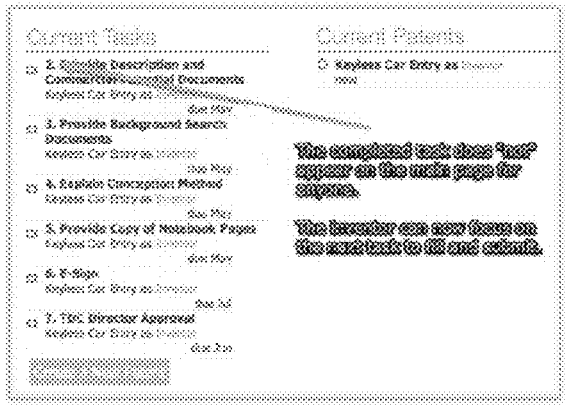

In embodiments, upon the reviewer selecting the complete button 9070, the task may be marked with an icon 9080 signifying that the task has been completed. In addition, a notification, as discussed with reference to FIG. 8a, may be received in the user's notifications list notifying the user that the submitted task has been reviewed and approved. In additional embodiments, the user may receive a notification email 9083 as shown in FIG. 9i informing the user of the completion of the task and that no further action is required for the task. In accordance with aspects of the invention, the completed task will no longer be displayed in the user's task list, as shown in FIG. 9j, and the inventor can now focus on the next task.

Figure 9K:
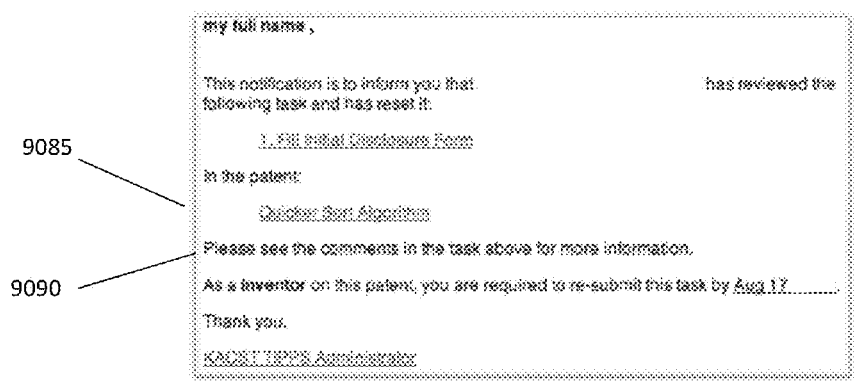
Figure 9L:
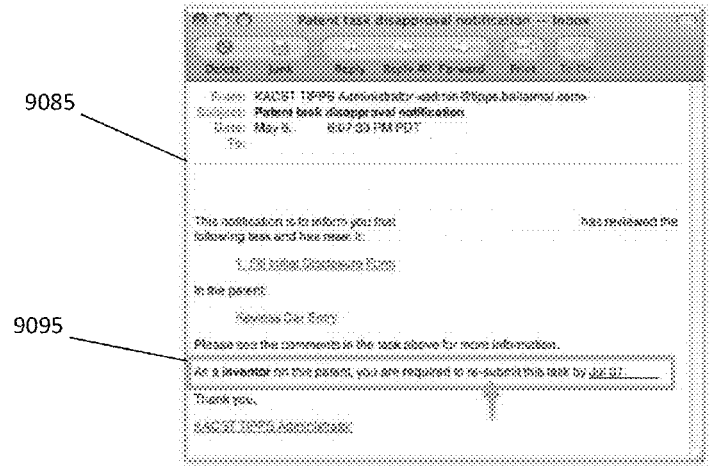

In further embodiments and as shown in FIG. 9k, the user may receive a notification 9085, which notifies the user that the task was rejected. Further, the notification 9085 may provide information 9090 directing the user to the comments related to the submitted task for additional information regarding the nature of the rejection. In embodiments, the notification 9085 may also provide a new due date 9095 for when the user may be required to resubmit a rejected task, as shown in FIG. 9l.

H. TDC Approval (Step 180)

In accordance with aspects of the invention, upon completion of all of the tasks for the new patent application and review thereof in steps 160 and 170, a TDC Director may now receive a new task in a task list 4060 for the TDC Director. The new task may request the TDC Director to provide final approval/rejection for the new patent application. For example, the TDC Director may have permissions 10005 to edit, comment, and/or complete any of the tasks in the new patent application, as shown in FIG. 10a. The dialog box in FIG. 10a, can provide the TDC Director with permissions for editing, comments, and completion.

In embodiments, the TDC Director may be able to select the new task from the task list in order to access a dialogue box 10010 that enables the TDC Director to provide final approval or rejection of the new patent application using a drop box 10015, as shown in FIG. 10b. For example, the TDC Director may be able to select the complete button 10020 in order to finally approve or reject the new patent application.

In accordance with aspects of the invention and as shown in FIG. 10c, an exemplary review process for the new patent application may comprise review process 10100. The review process 10100 may start at step 10110 when an inventor completes and submits a new invention disclosure as part of the new patent application process. In step 10115, a management team may receive notification from the TIPPS system via email that the invention disclosure has been submitted. In addition, at step 10120, the same notification may be submitted to an institute director and a sector head that a research team including the user, e.g., inventor, is reporting to; or the research falls within their scope.

At step 10125, the TIPPS system may provide the institute director with a predetermined period of time, e.g., due date, upon which to approve or disapprove the disclosure. At step 10130, in case of disapproval, the director may be required to provide a justification for the rejection and the issue may be propagated to the sector head level. At step 10135, once the new invention disclosure is approved, the TIPPS system may initiate a notification to the sector head to approve/disapprove the new invention disclosure. At step 10140, if no reply from the director is received after the predetermined period of time, the TIPPS system may initiate a reminder to the director and a copy to the management team. At step, 10145, after another predetermined period of time with no response received from the director, the TIPPS system may initiate a notification to the sector head.

At step 10150, the TIPPS system may be configured to give the sector head a predetermined period of time to approve/disapprove the disclosure. At step 10153, in the case of disapproval, the sector head may be required to prepare a justification for the rejection and the issue may be be propagated to an IP Committee. At step 10155, once the new patent disclosure is approved, the TIPPS system may be configured to initiate a notification to the management team to seek approval from IP Committee to proceed to the Attorney.

At step 10160, if no reply from the sector head is received after the predetermined period of time days, the TIPPS system may be configured to initiate a reminder to the sector head and send a copy of the reminder to the management team. At step 10165, after another predetermined period of time days with no response from the sector head, the notification may be forwarded to the management team, and the management team may propagate the issue to the IP Committee. In step 10170, if the institute director and the sector head both approve the disclosure, the IP Committee may eventually approve the disclosure to be filed with the Attorney and the management team proceeds with the process. In step 10175, in the instance of any difference between the institute director and the sector head, the IP Committee may make the final decision whether to file the new patent disclosure or not.

I. Patent Awarded (Step 190)

Figures 11A, 11B:
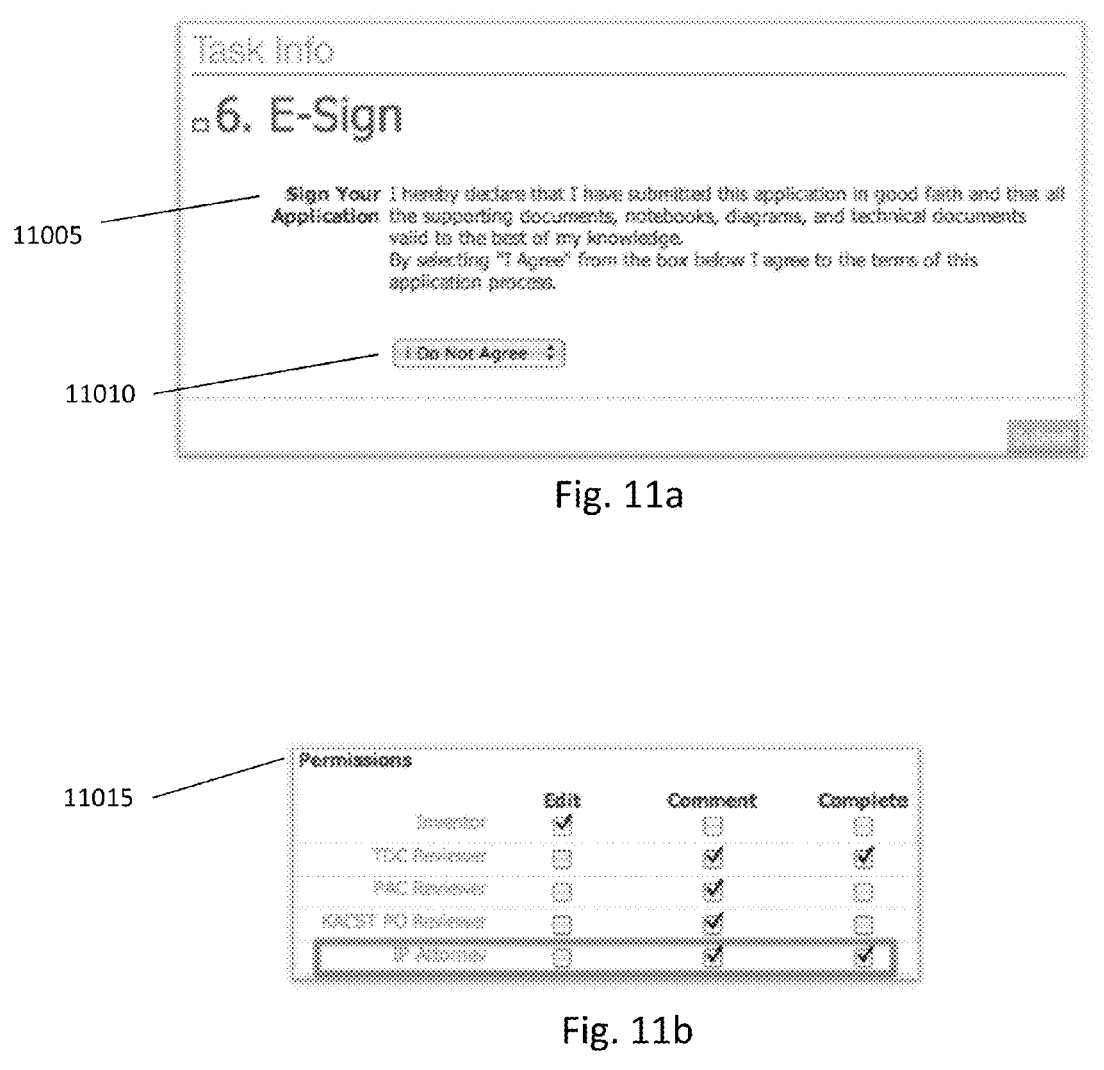

In accordance with aspects of the invention, once final approval of the new patent application is received in step 180, the inventor may now be requested to electronically sign documents for filing of the new patent application and final patent award, as shown in FIG. 11a. For example, the inventor may be requested to agree to a disclaimer 11005 regarding the filing of the new patent application by selecting a drop down box choice 11010 and selecting a submit button. In embodiments, the attorney may have permissions 11015 to approve and sign the new patent application for filing in a patent office.

Administration of the TIPPS System

The TIPPS system may be designed to allow administrators of the system to actively manage various aspects of the system. For example, the following non-exhaustive list provides examples of aspects that may be managed by administrators: System Users, Patents, Patent Role Handler Assignments, Task Templates, and Report Generation. In accordance with aspects of the invention, once an administrator logs into the TIPPS system, an Admin menu item 12005 may appear, as shown in FIG. 12a. The administrator may select the Admin menu item 12005 in order to enter an Admin section 12010, as shown in FIG. 12b, of the TIPPS system where the administrator may perform the administrative functions. The Admin section may include, for example, a maintenance section, a users section, a roles section, a templates section, a reports section, and a logout section.

Figure 12D:
Figure 12D:
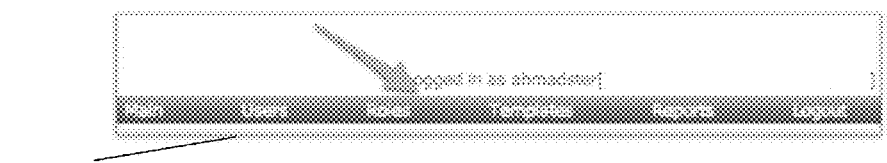
Figure 12D:
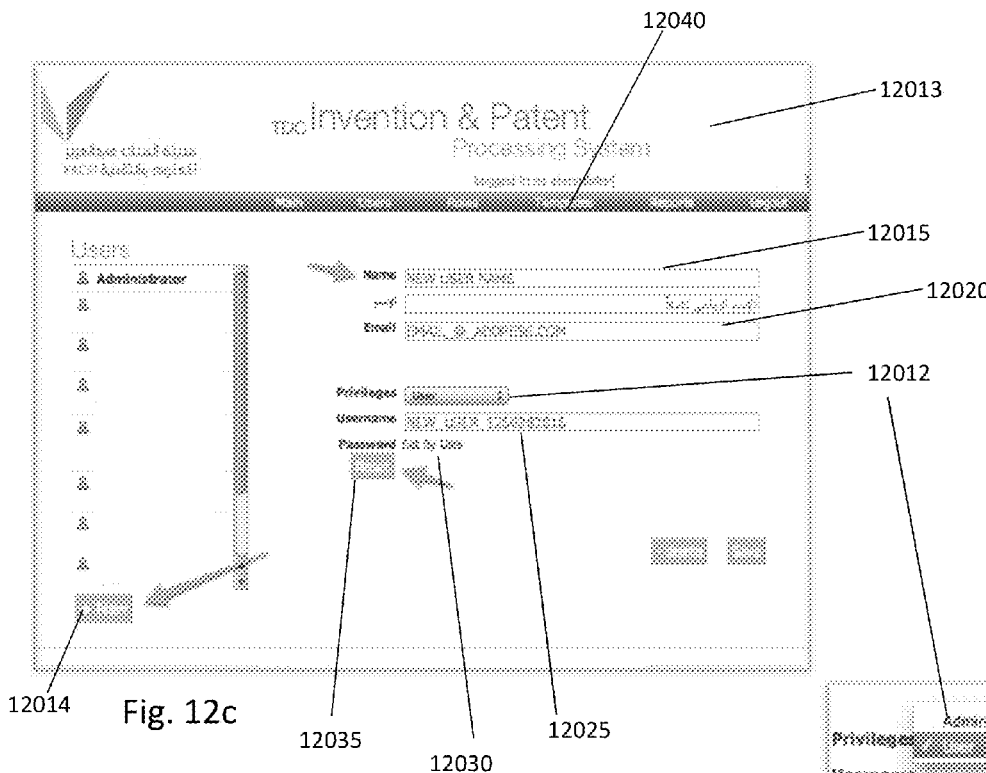
Figure 12D:

In embodiments, administrators may be any user that signs up to become an administrator. The administrator privilege may be activated by a drop-down menu 12012 in the Users admin section 12014, as shown in FIGS. 12c and 12d. For example, an administrator may choose to make any user an administrator by entering their account via the Users admin section 12013 and selecting administrator as a privilege from the drop-down menu 12012.

In embodiments, an administrator may be able to create user accounts much like a user as described with reference to FIGS. 4a and 4b. For example as shown in FIG. 12c, the administrator may be able to select a new user account button 12014 that generates fields for inputting in a user's name 12015, email 12020, username 12025, and password 12030 information to set up an account for the user. In further embodiments, the administrator may be able to reset a user's password by selecting a reset button 12035. User passwords may not be available to anyone but the user, even the administrator may not be provided with the user's password.

In embodiments, administrators may be able to assign role handlers to the new patent application. Role handler assignment is discussed in detail above with reference to FIGS. 7a and 7b.

In embodiments, administrators may be able to manage task templates. Task templates provide a flexible way for TIPPS administrators to collect information into a database in an efficient and easy manner. The task templates may comprise HTML forms arranged in an HTML table. The administrator may have control over the design of the task templates as well as the information collected using the task templates. In further embodiments, the TIPPS system may automatically scrub the task templates when they are saved for form input tags. This may include all named tags with an HTML name attribute. In embodiments, when a new form element is detected, the task's table may be automatically modified to match the form. This process may eliminate a need for separate database administration processes. For example, the database's schema may dynamically adjust to fit the data collected from the HTML forms.

In accordance with aspects of the invention, an administrator may start editing any task template by selecting a Templates menu item 12040 in the Admin section 12013, as shown in FIG. 12c. A list of task templates may appear and the tasks may be ordered by their labels. For example, starting the task labels with 1, 2, 3, 4, etc. . . . controls the order the tasks may appear when they are presented to a user on a display.

In embodiments, each task template may be assigned a predetermined amount of time limit for completing the task. For example, as shown in FIG. 12e, an administrator may provide a number of days 12045 a task is allowed to be filled-out and submitted before it is considered over due. Further, an administrator may provide a number of days 12050 a task is allowed to be reviewed and completed before it is considered over due. As shown in FIG. 12e, the task will allow the inventor 10 days to fill and submit the task from the date of creation. After that, it will allow the reviewers 10 days from the day it was submitted to review and complete the task. In addition, the task template may include, for example, a field to input whether the task is a required task for completing the overall project.

In further embodiments, the administrators may create tasks by transcribing HTML markup that will display tables and field for which a user may interact with to complete the tasks. For example, as shown in FIGS. 12f, 12g, and 12h, the administrator may transcribe HTML markup 12055 to create the input box 12060 and a new field 12065 in the task template to hold information that the user may enter into the database. Additionally, as shown in FIGS. 12i and 12j, the administrator may transcribe HTML markup 12070 to create larger tables 12075 to collect a paragraph of text. In embodiments, the field names in every task may be required to be unique such that two fields with the same name do not exist.

In further embodiments as shown in FIGS. 12k and 12l, the administrator may transcribe HTML markup 12080 to create date picker 12085 that a user may use in conjunction with a task. The addition of the class: "dateformat-d-sl-m-sl-Y formdatePicker" in the HTML markup 12080 may trigger javascript to add the date picker button and format the selected date as specified.

In further embodiments as shown in FIGS. 12m and 12n, the administrator may transcribe HTML markup 12090 to display the file upload manager 12095 to the user when they are viewing a task. For example, the TIPPS system may use a custom HTML tag named "file":file name="background_search_doc_1"></file> as shown in the HTML markup 12090.

In accordance with aspects of the invention, the administrator may be able to generate system reports. For example, as shown in FIG. 12o, the TIPPS system may provide a high-level overview for managers who wish to keep track of the patent applications TIPPS is processing. In embodiments, the report may show all patent applications 12100, their abstracts 12105, their task status 12110, and the names of the handlers 12115 assigned to the patent application.

As shown in FIG. 12p, the overview graph 12120 may show a breakdown of the task status 12110, including for example, new tasks, done tasks, and in review tasks. As shown in FIG. 12q, the lower row 12125 may show each particular task in the patent application. In embodiments, the lower row 12125 may include features such that hovering over a box 12130 with a pointer displays the task 12135 represented by the box 12130 and every box that represents a task and its status by color might be a direct link to the task. The administrator may be able to select the task to view the task represented. Further, overdue tasks may be outlined by a red border 12140 such that advantageously the administrator may be able to view overdue tasks easily.

In accordance with aspects of the invention, the administrator may also be able to run maintenance on the TIPPS system. The TIPPS system may rely on certain actions to be performed frequently to function correctly. For example, actions may be performed daily in order to maintain the TIPPS system functioning properly. In embodiments, the administrator may be able to schedule these actions and ensure they complete their run.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A method for reviewing a project comprising:
   assigning role handlers to the project;
   sending, by at least one computing device, a notification to a first role handler that a new task for the project has been completed;
   providing, by the at least one computing device the first role handler with a due date for completing a review of the new task, wherein the new task is associated with one of: a patentability search, completing a description, and completing an initial disclosure form;
   receiving, by the least one computing device, a completed review of the new task by the first role handler;
   sending, by the least one computing device, a notification to a second role handler that the new task has been reviewed by the first assigned role handler;
   providing, by the at least one computing device, the second assigned role handler with a due date for completing a review of the new task; and
   receiving, by the at least one computing device, a completed review of the new task by the second role handler;
   determining, by the at least one computing device, any differences between an outcome of the completed review performed by the first role handler and the completed review performed by the second role handler and sending the differences to an Intellectual Property (IP) committee to make a final decision regarding approval of an invention disclosure; and
   sending, by the at least one computing device, the invention disclosure to an attorney for filing of a patent application associated with the invention disclosure.

2. The method of claim 1, wherein the assigning further comprises assigning a third role handler to the project.

3. The method of claim 2, further comprising sending a notification to the third role handler that the first and second role handlers have reviewed the new task.

4. The method of claim 3, wherein:
   the notification to the first role handler is sent using email;
   the first role handler is an institute director; and
   the due date provided to the first role handler is a predetermined amount of days from the date of the sending of the notification to the first role handler.

5. The method of claim 4, wherein:
   the notification to the second role handler is sent using email;
   the second role handler is a sector head; and
   the due date provided to the second role handler is another predetermined amount of days from the date of the sending of the notification to the first role handler.

6. The method of claim 5, wherein the third role handler is a management team.

7. The method of claim 1, wherein the completing the review of the new task includes opening a dialogue box that permits the first role handler or the second role handler to input comments relating to the new task and wherein the method further comprises adding a time stamp to the comment and name and role of the first role handler or the second role handler.

8. A method for reviewing a project comprising:
   assigning role handlers to the project, wherein the assigning comprises assigning a third role handler to the project;
   sending, by at least one computing device, a notification to a first role handler that a new task for the project has been completed;
   providing, by the at least one computing device the first role handler with a due date for completing a review of the new task;
   receiving, by the least one computing device, a completed review of the new task by the first role handler;
   sending, by the least one computing device, a notification to a second role handler that the new task has been reviewed by the first assigned role handler;
   providing, by the at least one computing device, the second assigned role handler with a due date for completing a review of the new task; and
   receiving, by the at least one computing device, a completed review of the new task by the second role handler, sending a notification to the third role handler that the first and second role handlers have reviewed the new task, wherein:
the notification to the first role handler is sent using email;
the first role handler is an institute director;
the due date provided to the first role handler is a predetermined amount of days from the date of the sending of the notification to the first role handler;
the notification to the second role handler is sent using email;
the second role handler is a sector head;
the due date provided to the second role handler is another predetermined amount of days from the date of the sending of the notification to the first role handler;
the third role handler is a management team;
when the sector head approves the new task, the notification is sent to the management team requesting approval of the new task and the project;
when the sector head disapproves the new task, the notification is sent to the management team stating a justification by the sector head as to the reason the new task is disapproved;
when the sector head fails to complete the review of the new task prior to the due date, a second due date is provided two days from the previous due date; and
when the sector head fails to complete the review of the new task prior to the second due date, the notification is sent to the management team requesting approval of the new task and the project.

9. A computer program product comprising a computer usable storage medium having readable program code embodied in the storage medium, the computer program product includes at least one component operable to:
receive a request from a user to start a project;
send a notice that role handlers have been assigned to a plurality of tasks required to complete the project;
send a notice that at least one task of the plurality of tasks is requiring completion; and
send a notice that the at least one task has been reviewed by at least one of the assigned role handlers;
determine any differences between an outcome of the completed review performed by a first role handler and the completed review performed by a second role handler and send the differences to a committee to make a final decision regarding approval; and
send approval to a third party for completing a project associated with the review,
wherein:
the at least one task is associated with one of: a patentability search, completing a description, and completing an initial disclosure form;
the sending the notice that the role handlers have been assigned comprises displaying the notice on a web page and sending an email to the user; and
the sending the notice that the at least one task is requiring completion comprises displaying the at least one task along with a due date for completing the at least one task on the web page with the notice that the role handlers have been assigned.

10. The computer program product of claim 9, wherein the at least one component is further operable to display a name of the project on the web page with the least one task that is displayed.

11. The computer program product of claim 10, wherein the at least one component is further operable to display the role handlers assigned to the plurality of tasks upon the name of the project being selected by the user.

12. The computer program product of claim 9, wherein:
the committee is an Intellectual Property (IP) committee;
the approval is for an invention disclosure; and
the sending the approval to the third party is for filing a patent application associated with the invention disclosure.

13. A computer system for reviewing a project, the system comprising:
a CPU, a computer readable memory and a computer readable storage media;
first program instructions to assign role handlers to the project;
second program instructions to send a notification to a first role handler that a new task for the project has been completed, wherein the new task is associated with one of: a patentability search, completing a description, and completing an initial disclosure form;
third program instructions to provide the first role handler with a due date for completing a review of the new task;
fourth program instructions to receive a completed review of the new task by the first role handler;
fifth program instructions to send a notification to a second role handler that the new task has been reviewed by the first assigned role handler;
sixth program instructions to provide the second assigned role handler with a due date for completing a review of the new task;
seventh program instructions to receive a completed review of the new task by the second role handler;
eighth program instructions to determine any differences between an outcome of the completed review performed by the first role handler and the completed review performed by the second role handler and sending the differences to a committee to make a final decision regarding approval; and
ninth program instructions to send approval to a third party for completing a project associated with the review,
wherein the first though ninth program instructions are stored on the computer readable storage media for execution by the CPU via the computer readable memory.

14. The system of claim 13, wherein the project comprises submission of a new invention disclosure for approval, and the system further comprises program instructions to receive the new invention disclosure.

15. The system of claim 14, wherein the assigning further comprises assigning a third role handler to the project, and the system further comprises program instructions to send a notification to the third role handler that the first and second role handlers have reviewed the new task.

16. The system of claim 15, wherein:
the notification to the first role handler is sent using email and the notification is of the new invention disclosure;
the first role handler is an institute director; and
the due date provided to the first role handler is a predetermined amount of days from the date of the sending of the notification to the first role handler.

17. The system of claim 16, wherein:
the notification to the second role handler is sent using email and the notification is of approval of the new invention disclosure by the institute director;
the second role handler is a sector head; and
the due date provided to the second role handler is another predetermined amount of days from the date of the sending of the notification to the first role handler.

18. The system of claim 17, wherein the third role handler is a management team.

19. The system of claim 13, wherein the project comprises submission of a new invention disclosure for approval, and the system further comprises program instructions to receive the new invention disclosure and send a notice that the role handlers have been assigned to a plurality of tasks required to complete the project.

20. The system of claim 19, wherein the sending the notification that the role handlers have been assigned comprises displaying the notification on a web page and sending an email to a user that submitted the new invention disclosure.

21. The system of claim 20, wherein the sending the notification that the new task for the project has been completed comprises displaying the new task along with a due date for completing review of the new task.

22. The system of claim 13, wherein:
the committee is an Intellectual Property (IP) committee;
the approval is for an invention disclosure; and
the sending the approval to the third party is for filing a patent application associated with the invention disclosure.

23. A computer system for reviewing a project, the system comprising:
a CPU, a computer readable memory and a computer readable storage media;
first program instructions to assign role handlers to the project;
second program instructions to send a notification to a first role handler that a new task for the project has been completed, wherein the new task is associated with one of: a patentability search, completing a description, and completing an initial disclosure form;
third program instructions to provide the first role handler with a due date for completing a review of the new task;
fourth program instructions to receive a completed review of the new task by the first role handler;
fifth program instructions to send a notification to a second role handler that the new task has been reviewed by the first assigned role handler;
sixth program instructions to provide the second assigned role handler with a due date for completing a review of the new task;
seventh program instructions to receive a completed review of the new task by the second role handler; wherein:
the first though seventh program instructions are stored on the computer readable storage media for execution by the CPU via the computer readable memory;
the project comprises submission of a new invention disclosure for approval, and the system further comprises program instructions to receive the new invention disclosure;
the assigning further comprises assigning a third role handler to the project, and the system further comprises program instructions to send a notification to the third role handler that the first and second role handlers have reviewed the new task;
the notification to the first role handler is sent using email and the notification is of the new invention disclosure;
the first role handler is an institute director;
the due date provided to the first role handler is a predetermined amount of days from the date of the sending of the notification to the first role handler;
the notification to the second role handler is sent using email and the notification is of approval of the new invention disclosure by the institute director;
the second role handler is a sector head;
the due date provided to the second role handler is another predetermined amount of days from the date of the sending of the notification to the first role handler;
the third role handler is a management team;
when the sector head approves the new task, the notification is sent to the management team requesting approval of the new task and the project;
when the sector head disapproves the new task, the notification is sent to the management team stating a justification by the sector head as to the reason the new task is disapproved;
when the sector head fails to complete the review of the new task prior to the due date, a second due date is provided two days from the previous due date; and
when the sector head fails to complete the review of the new task prior to the second due date, the notification is sent to the management team requesting approval of the new task and the project.

* * * * *